US010467065B2

(12) United States Patent
Ross et al.

(10) Patent No.: US 10,467,065 B2
(45) Date of Patent: Nov. 5, 2019

(54) SYSTEM AND METHODS FOR DISCOVERING AND MANAGING KNOWLEDGE, INSIGHTS, AND INTELLIGENCE USING A CONTEXT ENGINE HAVING THE ABILITY TO PROVIDE A LOGICAL SEMANTIC UNDERSTANDING OF EVENT CIRCUMSTANCES

(71) Applicant: Apiri, LLC, Falls Church, VA (US)

(72) Inventors: Edward Penstone Ross, Boulder, CO (US); David Marion Giles Ross, Falls Church, VA (US)

( * ) Notice: Subject to any disclaimer, the term of this patent is extended or adjusted under 35 U.S.C. 154(b) by 135 days.

(21) Appl. No.: 15/703,107

(22) Filed: Sep. 13, 2017

(65) Prior Publication Data
US 2019/0079810 A1 Mar. 14, 2019

(51) Int. Cl.
*G06F 9/54* (2006.01)
*G06F 16/28* (2019.01)
*G06N 5/02* (2006.01)

(52) U.S. Cl.
CPC ............ *G06F 9/542* (2013.01); *G06F 16/288* (2019.01); *G06N 5/022* (2013.01)

(58) Field of Classification Search
CPC ........ G06F 9/542; G06F 16/288; G06N 5/022
See application file for complete search history.

(56) References Cited

U.S. PATENT DOCUMENTS

| 6,078,326 A | 6/2000 | Kilmer et al. |
| 8,374,881 B2 | 2/2013 | Bangalore et al. |
| 8,700,620 B1 | 4/2014 | Lieberman |
| 2009/0224867 A1* | 9/2009 | O'Shaughnessy ........................ H04M 1/72569 340/5.1 |

(Continued)

FOREIGN PATENT DOCUMENTS

WO  2015 103503 A1  7/2015

OTHER PUBLICATIONS

International Search Report and Written Opinion dated Dec. 12, 2018 in International Application No. PCT/US2018/050365.

*Primary Examiner* — Charles E Anya
(74) *Attorney, Agent, or Firm* — Muncy, Geissler, Olds & Lowe, P.C.; Aaron J. Sanders

(57) ABSTRACT

The disclosure relates to a context engine that can be used to identify, align, associate, validate, anticipate, and analyze new knowledge, insights and intelligence from large amounts of digital data. The essential foundation of knowledge about events is the clear and specific definition and understanding of the circumstances of those events. The present disclosure integrates modern technological capabilities including relational database structures and processing algorithms with an underlying semantic foundation to provide the opportunity for contextual understanding, analysis and insight. In various embodiments, the context engine may be based on "Five W" event circumstances, including "Who", "Where", "When", "What", and "Why" circum- (Continued)

stances that provide a logical semantic foundation for knowledge and understanding about modeled events, enabling users to associate those circumstances with existing information. Accordingly, the context engine may provide a substantive, intuitive, scalable, and searchable layer of context to the universe of available data and information.

25 Claims, 14 Drawing Sheets

(56) References Cited

U.S. PATENT DOCUMENTS

| | | |
|---|---|---|
| 2010/0100546 A1 | 4/2010 | Kohler |
| 2010/0250367 A1 | 9/2010 | Smith et al. |
| 2011/0276615 A1* | 11/2011 | Grigorovici ........ G06F 16/9535 709/201 |
| 2013/0268483 A1 | 10/2013 | Di Profio et al. |
| 2015/0154263 A1 | 6/2015 | Boddhu et al. |
| 2015/0235135 A1 | 8/2015 | Shastri et al. |
| 2016/0328482 A1* | 11/2016 | Shah .................... G06F 16/9535 |
| 2016/0358065 A1* | 12/2016 | Gedge .................... G06N 3/006 |
| 2017/0118348 A1* | 4/2017 | Dotan-Cohen ... H04M 3/42365 |

\* cited by examiner

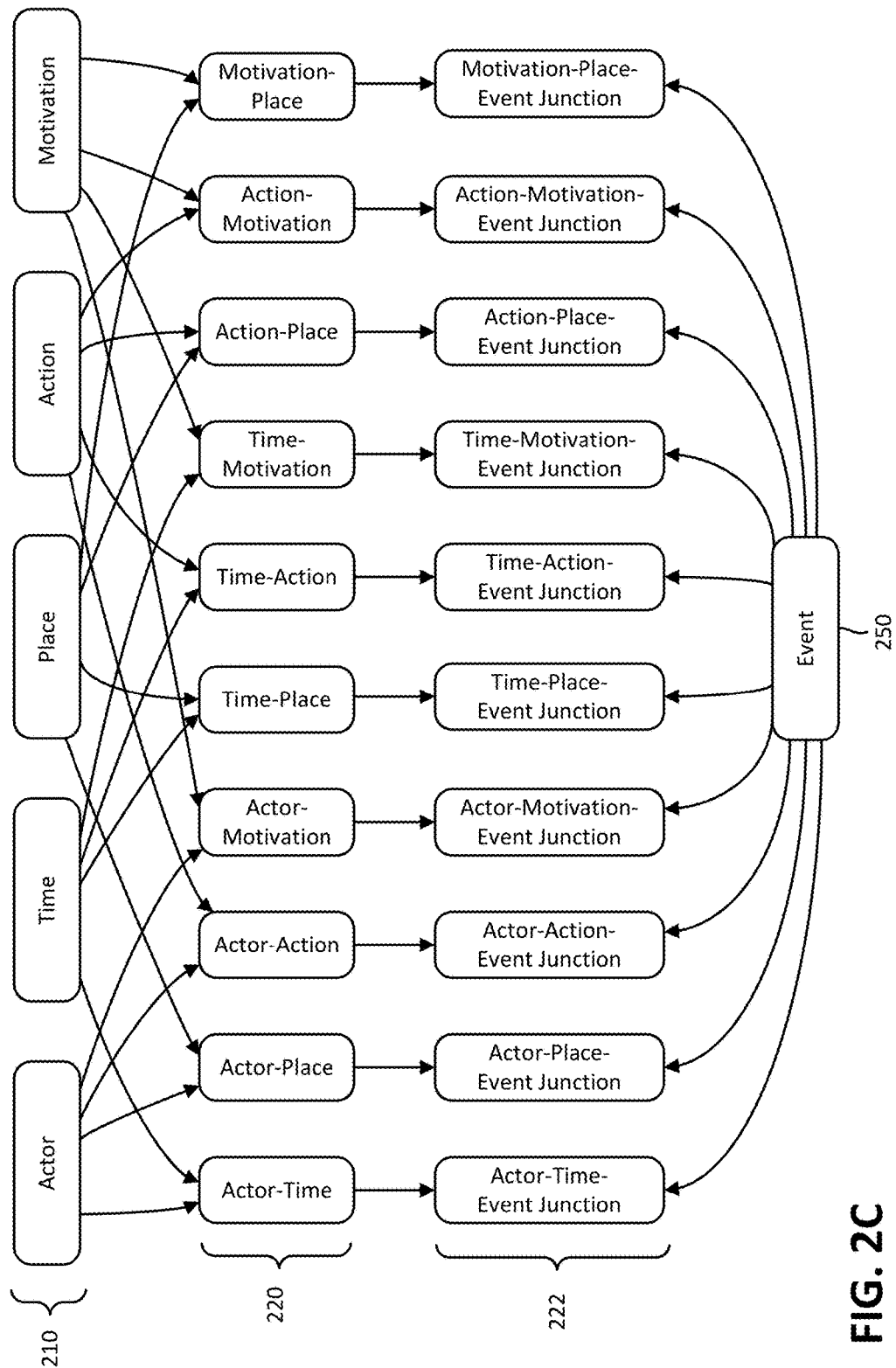

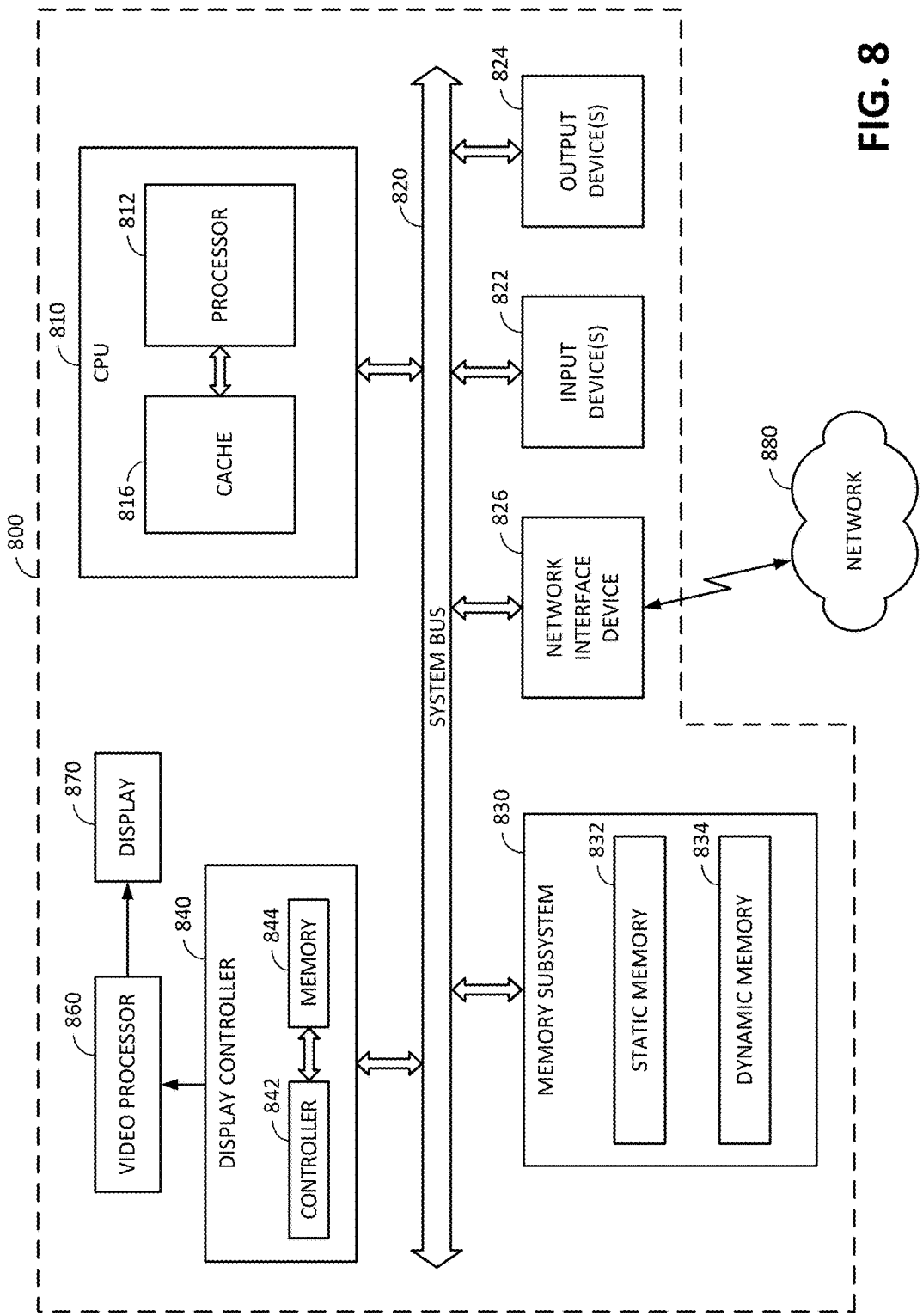

SYSTEM AND METHODS FOR DISCOVERING AND MANAGING KNOWLEDGE, INSIGHTS, AND INTELLIGENCE USING A CONTEXT ENGINE HAVING THE ABILITY TO PROVIDE A LOGICAL SEMANTIC UNDERSTANDING OF EVENT CIRCUMSTANCES

TECHNICAL FIELD

The various aspects and embodiments described herein generally relate to information analysis and knowledge management systems that have the ability to accept and process large volumes of inputs in order to identify and illuminate patterns and conclusions that represent the transformation of data and information into knowledge and understanding, and more particularly, to a context engine having the ability to model, investigate, and analyze events and underlying circumstances across multiple dimensions.

BACKGROUND

Computers and computing devices have a long history dating back thousands of years to places including ancient Babylonia, Greece, Rome, China, and Arabia. During the industrial revolution, Charles Babbage and Ada Lovelace developed concepts relating to mechanical computing machines and programming. However, the concept of the general purpose computer did not emerge until 1936 when Alan Turing published his seminal paper on computing theory titled "On Computable Numbers, With An Application To The Entscheidungsproblem." With this event, humanity crossed the digital divide bringing us to the point today where the volume of digital data generated in a single year surpasses the volume of data created in all previous human history. From the very moment the first military and business applications emerged, people have been challenged to analyze, interpret, and make decisions based on digital data. The general categories of these efforts have included Decision Support Systems, Knowledge Management Systems, Content Management Systems, Data Warehousing and Data Mining, Artificial Intelligence Systems, and Search Engines, to name a few.

More particularly, a Decision Support System (DSS) typically incorporates techniques that leverage existing processes and targets with an attempt to optimize specific point decisions in a management model. DSS-based solutions tend to be highly dependent upon the underlying application and can provide insight and guidance only within tightly bound constraints. In a Knowledge Management (KM) System, efforts generally aim to capture the human learning and understanding of an organization through cultural assessment of the information required in the performance of specific jobs and roles. These solutions are more focused on community, sharing, and preserving the human capital of an organization and less so on analyzing and interpreting the information to gain new knowledge or insights. Content Management (CM) Systems are usually used to capture, archive and manage the various forms of structured and unstructured data important to an organization and make that information available to individuals and other systems. Although CM-based solutions can provide an exhaustive repository of information, CM-based solutions typically make no effort to understand or illuminate the underling meaning of the data.

Other proposed solutions, such as Data Warehousing (DW) and Data Mining (DM) (also known as Business Intelligence), fall into the class of applications that represents the initial efforts to use analytic tools and processes to uncover and create new knowledge from existing data. The challenges include difficulties to build logical models that reflect operational reality and the inability to manage data quality in transition from source systems to centralized repositories. Artificial Intelligence (AI) Systems introduce aspects related to machine learning and the desire to enable computing processes that have the ability to self-organize and independently recognize patterns and structures that may be relevant for human consideration. Search Engines include some of the most important and successful technology solutions that the world has seen. For example, search engines can provide immediate, real-time access to the substantial information maintained on the World Wide Web and other data sources, typically using proprietary algorithms to assess relevance of that information based on aggregated user activity. While profoundly significant, this class of solutions does not directly or transparently provide deeper meaning, logic, or insights from the information, nor does this class of solutions allow for the introduction of personalized structures or access to private data.

Accordingly, existing efforts to analyze, interpret, and make decisions based on digital data, including the solutions discussed above, have insufficiently dealt with the way that people really want to access the data in the world or enable the true opportunities for discovery, verification, association, and/or prediction that this worldwide body of data can provide. Although other concepts such as Web 3.0, Semantic Web, and Knowledge Engines are emerging, at the present point in time there are no systems or methods that have been successful in delivering on the underlying promises of an "Intelligent Web." The evolution of the Internet has moved from Web 1.0 being static information, to Web 2.0 incorporating greater interactivity and social connectivity, and now to the vision of Web 3.0 being based on natural language processing, autonomy and intelligence. The Semantic Web is a similar or equivalent vision of an Internet based on frameworks and standards where there is an autonomous connectivity of machines and applications across technology, informational and community boundaries. The Knowledge Engine is an effort to bring trust and credibility to web delivered information. While progress is being made and clearly the ways and uses of information is continuing to evolve, as of yet these concepts have not matured to the point of technical, economic or social viability.

One key reason is the lack of an underlying informational framework that provides the foundational logic and structure to enable contextual definition and interpretation of the information contained on the Internet. For example, the technical architecture of the Internet has generally been based on two key frameworks. The physical Internet Protocol (IP) addresses are allocated and maintained by the Internet Assigned Numbers Authority (IANA) under the governance of the Internet Corporation for Assigned Names and Numbers (ICANN). The Domain Name System (DNS) and Uniform Resource Locators (URLs) are maintained by multiple domain name registrars also under the governance of ICANN. These frameworks respectively enable the identification and connections of devices (colloquially the Internet of Things (IoT)) and web pages (the World Wide Web (WWW)). Neither of these frameworks have the capability to manage the contextual meaning or content of information.

Thus there exists a need for a system and a set of methods that can provide the context of logical semantic meaning and deliver the tools and capabilities to create and manage knowledge, insights, and intelligence from large global data collections. Information is data in context. Wisdom is information with understanding. The present disclosure provides the foundational capabilities for contextual navigation that enables these transformations of awareness, insight, and knowledge. In particular, as will be described in further detail herein, the present disclosure relates to an information context engine that may implement various logical semantic data structures and processing algorithms, which may be integrated with bi-directional HyperText Markup Language (HTML) and Uniform Resource Locator (URL) links to and from World Wide Web structures and thereby deliver the ability to discover, explore and analyze information in novel, innovative, and useful ways.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to various aspects, as will be described in further detail herein, the present disclosure may define a semantic framework for an information context engine and various technological elements to make the information context engine operational. The present disclosure may thereby enable human users to apply one of the oldest, most intuitive, and widely recognized logical frameworks to the existing universe of information on the Internet, and to add new information, knowledge, and understanding. More particularly, the fundamental structure for the information context engine may be based on a "Five W" definition of the circumstance dimensions of an event, as the Five W's generally represent questions whose answers provide a discrete and substantially complete description of a particular event. As such, to be considered complete from a logical semantic perspective, any particular event may require a clear, explicit, and unique definition of the "Who", "Where", "When", "What", and "Why" of the event. With that level of specificity, understanding of the event can be considered complete and this same level of specificity may then provide a logical semantic framework to identify events, identify associated events, and assess the truthfulness of events, among other things. Accordingly, the present disclosure may provide a semantic framework that can be used to establish the logical semantic structure of events and the relationships between events based on various circumstance dimensions that are generally based on the Five W's.

According to various aspects, in vernacular usage the digital universe of circumstances may include any suitable available "data" that is common, ubiquitous, pervasive and growing in volume at astounding rates. The information context engine may integrate circumstances into specific and unique events and define relationships between such events to derive what can then be considered knowledge, insight, and intelligence, and understanding regarding the events and their underlying circumstances. The present disclosure may assume that events and relationships between events are neither random nor evenly distributed in the digital world. As such, the various aspects and embodiments described herein may provide a data model, a collection of methods, and a system that may allow individuals and applications to identify, investigate, and navigate information using a semantic logical structure that is fundamental to language and logic. The information context engine may thereby enable the answering of questions such as:

Who else is involved in this event?
When did this start?
Where else is this happening?
What is going to happen next?
Why did somebody do this?

According to various aspects, as will be described in further detail herein, the information context engine may support various methods and systems based on the core logical semantic concept of circumstances and events that enable these capabilities, including a core data structure that serves as a central integrating mechanism and various algorithmic mechanisms that may provide the automation to establish, assess, and evaluate the relationships between many events. For example, the various algorithmic mechanisms may allow a user to hold one Five-W event circumstance constant and select a second related Five-W event circumstance variable as independent to reveal one or more relationships between the constant circumstance, the selected independent circumstance variable, and all other Five-W dependent circumstances that are associated with the event and other related events. These and other capabilities may allow users to aggregate and interpret the underlying data in new and innovative ways. The various aspects and embodiments described herein may thereby provide a substantive, intuitive, scalable, and searchable layer of context to the universe of data and information on the Internet, and will add new knowledge and understanding to events in literature, human history, and/or other suitable contexts.

According to various aspects, the core data structure that may serve as the central integrating mechanism may be a circumstance-event lens, which may document the Five W circumstances of various events and associated information for the events. The circumstance-event lens may define the dimensions of each specific and unique event and enable navigation along each dimension of event circumstances, i.e., Who, When, What, Where, Why, to identify, research, investigate, and understand the selected and associated events. The circumstance-event lens may therefore provide the structures to investigate an event with all five dimensions or a subset of those dimensions defined, and then selectively identify and retrieve associated events with four, three, two, or one of the same dimensional values as the original event. The model may include primary tables for the combinations of two, three, and four circumstance dimensions and junction tables that allow for consolidated and integrated connections of those combinations to the broader universe of documented events.

According to various aspects, the organization and structure of the tables in the circumstance-event lens may be unique identifiers for circumstances, circumstance combinations, and events. For each circumstance value in the primary circumstance tables, a logical value may be defined to provide a unique key structure to identify, store, and retrieve that circumstance value. For the multiple dimension circumstance combination tables, the unique logical key structure may be a concatenated combination of the specific values of the circumstance combination. For each event, the unique logical key structure may be the fully concatenated combination of the five circumstances that uniquely identify the event.

According to various aspects, the algorithmic mechanisms mentioned above may provide automated capabilities to establish, navigate, and validate the content and relationships between and among specific events. The algorithmic mechanisms may use the data structures of the circumstance-event lens to retrieve and assess data content and relationships in a manner that would otherwise be difficult or impossible without the use of highly automated processes. For example, in various embodiments, the algorithmic mechanisms described herein may include circumstance affinity selection processing, circumstance synonymous value concordance processing, event association score processing, event veracity score processing, and event inferred circumstance candidate identification.

According to various aspects, the circumstance affinity selection processing may provide capabilities to select a single value of a single circumstance dimension and then use the circumstance-event lens and the body of data maintained in the database to suggest other dimension values. The suggestions may be based on affinities between the dimensions, and selection and recommendations may build from one to two dimensions, then two to three dimensions, then three to four dimensions, and then guidance towards potential new events with five specific and unique dimensional values.

According to various aspects, the circumstance synonymous value concordance processing may provide capabilities to determine and define relationships and meaning of specific values for a circumstance dimension that may be equivalent, nested, or proximate. Based on the relative relationship between circumstance values, a broader circumstantial context within events and other related circumstances can be interpreted, extrapolated, and/or extended based on the contextual meaning of the specific values.

According to various aspects, the event association score processing may provide capabilities to assess, evaluate and link events based on the level of association between dimensional circumstances. By using the circumstance-event lens to recognize the context of an event, the algorithm may evaluate the affinity of each dimension of other events and apply a weighting factor to link to the next most meaningful event on one or more Actor (who), Time (when), Location (where), Action (what), and/or Motivation (why) dimension(s).

According to various aspects, the event veracity score processing may provide capabilities to verify and validate the truthfulness of a specific event. For example, using the circumstance-event lens to identify associated events, the algorithm may assess whether a given Actor was present at another time and/or place than the event being tested. If so, and if that event has a high level of confidence, then the tested event can be considered false (or less likely to be true). If the empirical dimensions of time, place, and identity are not immediately denied by an "alibi" event, then the algorithm may conduct empirical, action, and motivation consistency assessments to develop and assign a veracity score that can be used to consider the potential validity of the event.

According to various aspects, the event inferred circumstance candidate identification may provide capabilities to infer or anticipate a missing circumstance value for an event based on the semantic logical contextual relationships of the known circumstance values. Using the circumstance-event lens to identify, assess, and rank candidate circumstance values based on the contextual relationships between the known circumstances, the algorithm may identify and suggest plausible and possible values for missing circumstance values on the Actor (who), Time (when), Location (where), Action (what), and/or Motivation (why) dimension(s).

Accordingly, as summarized above and as will be described in further detail below, the present disclosure may provide a cohesive and integrated set of data models and processing algorithms that can establish a context framework usable to research and investigate the insights, intelligence, and meaning of events and the links between events. These models and algorithms may be integrated with batch collection, event entry, and analysis and investigation interfaces to create business applications and technology systems. Through introducing a rigorous logical semantic structure, establishing a data model that allows for defining and navigating an event using that structure via the universe of events along one, two, three, and four circumstance dimensions while also applying affinity, concordance, association, veracity, and inferred candidate algorithms, the present disclosure may provide a new, novel and useful set of methods and system for context management.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which:

FIG. 2C illustrates an exemplary circumstance pair-to-event relationship model, which may be used to navigate the circumstance-event lens along two event dimensions, according to various aspects.

FIG. 8 illustrates an exemplary system in which the various aspects and embodiments described herein may be suitably practiced.

DETAILED DESCRIPTION

Figure 1A:
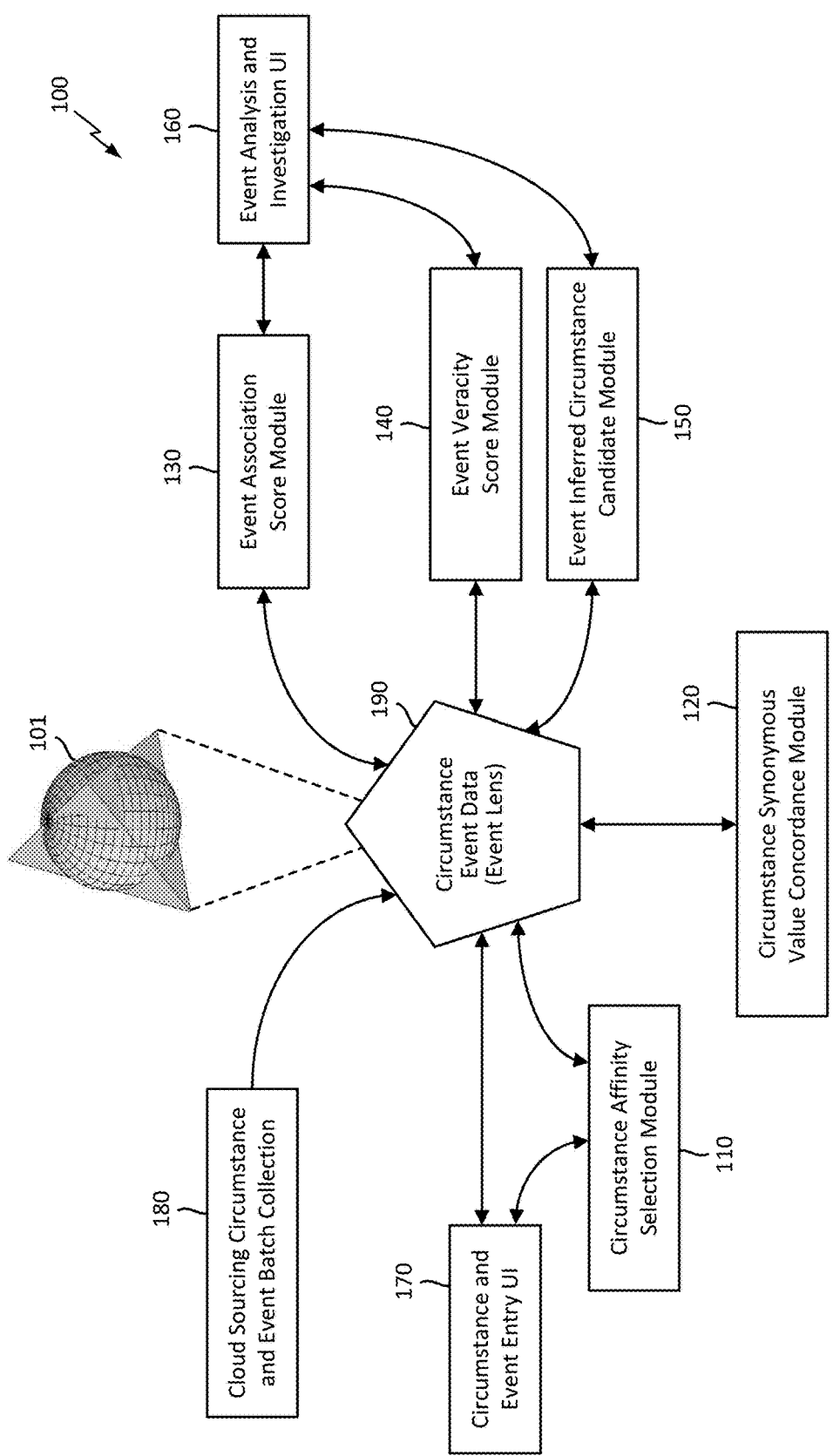
FIG. 1A illustrates an exemplary architecture for a context engine that can derive meaning and intelligence from a structured logical semantic organization of digital data, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

According to various aspects, a context engine as described herein may provide capabilities to derive meaning and intelligence from a structured logical semantic organization for digital data. More particularly, with initial reference to FIG. 1, an exemplary architecture 100 is shown for the context engine, wherein the architecture 100 may be built around one or more databases that may provide an event lens 190 to store and provide visibility into recorded events 101. In the architecture 100 as shown in FIG. 1, each event 101 may be defined as a semantic logical construct that documents a unique and full set of circumstances, including at least the Who, What, Where, When, and Why related to the event 101. Furthermore, in various embodiments, an event 101 may be associated with one or more additional circumstances such as How (e.g., in what way, by what means), and may be linked to existing web pages or other information relating to the event. Although the event lens 190 may have the ability to document these additional circumstances, the primary architecture of the present disclosure leverages the Five W's mentioned above to put additional circumstances into context, e.g., using When, Where, and Why circumstances to document a How circumstance, or using all five W's to place a fact on a webpage or another source into universal context.

For example, according to various aspects, the circumstance-event lens 190 may define the dimensions of each specific and unique event 101 and enable navigation along each circumstance dimension of any event 101 or collection of events 101 to identify, research, investigate, and understand the selected and associated events 101. The circumstance-event lens 190 may therefore provide the structures to investigate an event 101 with all five dimensions or a subset of those dimensions defined, and then selectively identify and retrieve associated events 101 with four, three, two, or one of the same dimensional values as the original event 101. As will be described in further detail below, the model used in the circumstance-event lens 190 may include primary tables for combinations of multiple circumstance dimensions and junction tables that allow for consolidated and integrated connections of those combinations to the broader universe of documented events 101. In one implementation, the circumstance-event lens 190 may organize and structure the tables using unique identifiers for circumstances, circumstance combinations, and events 101. For each circumstance value in the primary circumstance tables, a logical value may be defined to provide a unique key structure to identify, store, and retrieve that circumstance value. For the multiple dimension circumstance combination tables, the unique logical key structure may be a concatenated combination of the specific values of the circumstance combination. For each event 101, the unique logical key structure may be the fully concatenated combination of the five circumstances that uniquely identify the event 101.

According to various aspects, at a high level, the context engine may provide a crowd-sourced information space that can graphically represent recorded events 101 in a manner that is searchable, understandable, and substantially scalable. For example, working with the known and recorded events 101 modeled via the event lens 190, the context engine may provide a visual representation associated with the events 101 and relationships among the events 101, identify possibly unknown but certain historical events 101, identify false or potentially incorrect information, and provide predictive capabilities, among other things. In various embodiments, the event 101 and the event lens 190 may be used to implement the fundamental semantic logical construct used in the context engine, which is depicted in FIG. 1 as having a graphical representation based on a regular tetrahedron merged with a sphere. In general, each event 101 may provide a distinct and different answer to the five questions of Who, Where, When, What, and Why. For example, in the tetrahedron shown in FIG. 1, each point on the tetrahedron may represent an answer to one of the Who, What, Where, and When questions, while the sphere may represent an answer to the Why question. However, those skilled in the art will appreciate that in various embodiments, the various points on the tetrahedron and/or the sphere inscribed in the tetrahedron may be used to represent any suitable combination of the Five W circumstances.

Figure 1B:
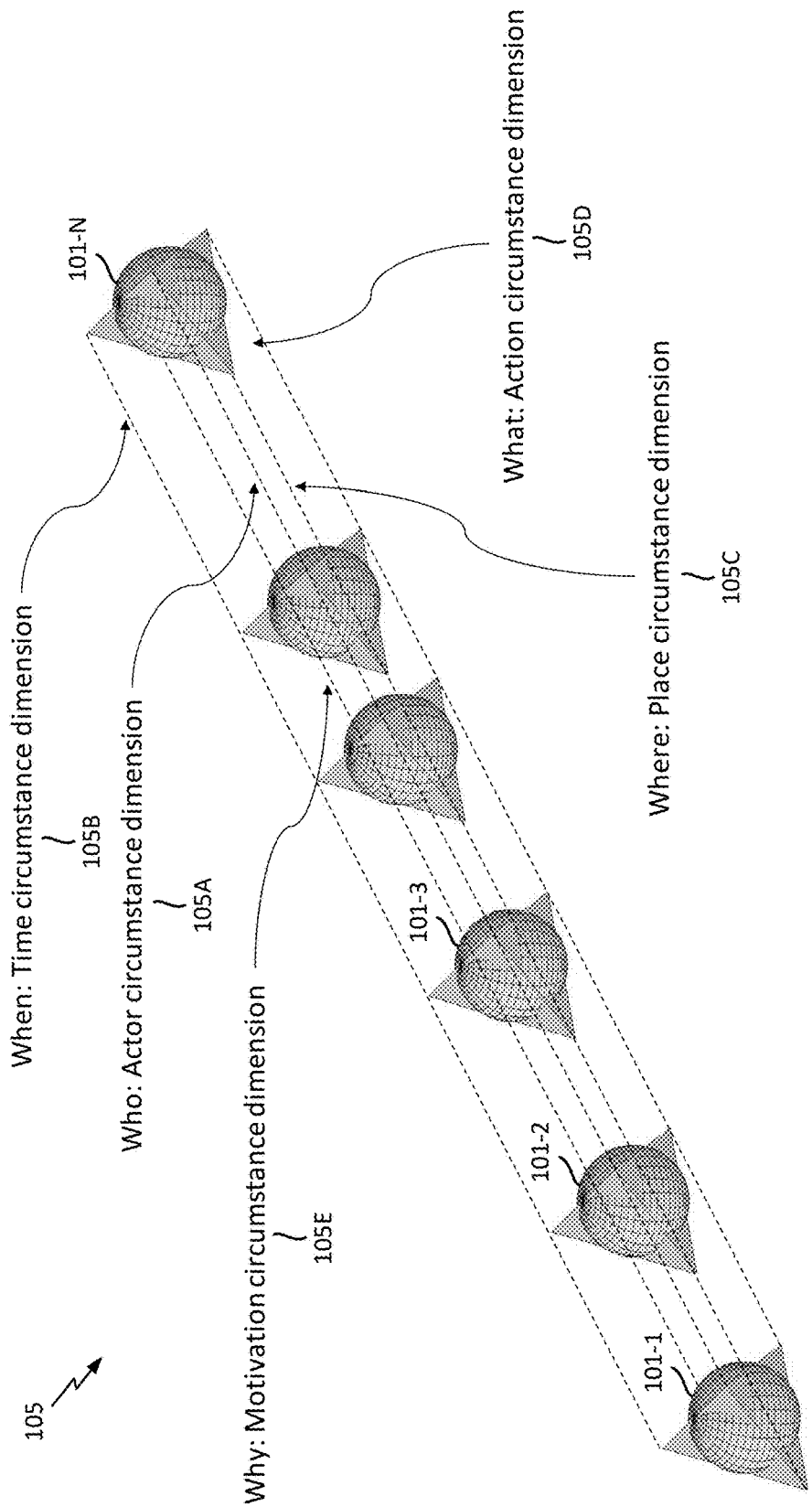
FIG. 1B illustrates an exemplary notional relationship among several events, according to various aspects.

In various embodiments, the architecture 100 as shown in FIG. 1 may include one or more user interfaces, including an event analysis and investigation user interface 160 that may be interact with one or more modules to allow users to assign veracity scores to any one or more of the five circumstances associated with an event 101, engage in focused debates on the facts supporting each circumstance, view and/or sort related events 101 according to one or more circumstances or sets of circumstances, etc. For example, one possible basis for a graphical user interface (GUI) that may be used in the event analysis and investigation user interface 160 to reveal relationships between recorded events 101 is shown in FIG. 1B. In particular, FIG. 1B illustrates a notional relationship 105 among several events 101-1, 101-2, 101-3, . . . , 101-N, where each respective event 101 includes various circumstances that may be related to other similar or related event circumstances, upon one or more axes relating to the points of the tetrahedron and the inscribed sphere as shown in FIG. 1A and FIG. 1B, where the axes include an actor (who) circumstance dimension 105A, a time (when) circumstance dimension 105B, an actor place (where) circumstance dimension 105C, and an action (what) circumstance dimension 105D corresponding to the points of the tetrahedron as well as a motivation (why) circumstance dimension 105E corresponding to the inscribed sphere. In the example GUI contemplated in FIG. 1B, each recorded event 101-1 . . . N represents the fundamental element or "atom" of that conceptual universe.

According to various aspects, the architecture 100 shown in FIG. 1 may leverage advances in computing power, data storage, and other technological capabilities to aggregate, document, and otherwise record a substantially unlimited number of events 101. The present disclosure enables a visual, searchable, scalable framework for substantially all or any aspect of human history, all fictional events in a literary canon, or perhaps one's lifetime of human memories, to name just a few possible examples. Furthermore, the present disclosure provides the ability to retrieve data related to such events 101 at will. For example, according to various embodiments, the architecture 100 may include a crowd sourcing circumstance and event batch collection module 180, which may be configured to obtain any suitable available data that represents circumstances surrounding a given event 101 or events 101. Furthermore, as shown in FIG. 1, the architecture 100 may include a circumstance and event entry user interface 170 that may permit one or more users to enter information (i.e., circumstance data) to define a new event 101 that is then modeled via the event lens 190. In any case, once the event lens 190 has been suitably populated with data that represents the events 101 according to unique sets of circumstances, the context engine may organize the data according to a structured logical semantic data model, which will be described in further detail below with reference to FIG. 2A through FIG. 2F. Once the data has been suitably organized, the event lens 190 may store substantial information and knowledge as a crowd-sourced set of memories that may be searchable and understandable to casual users as well as artificial intelligence or other suitable applications. By associating existing web content with an event 101 through the event lens 190, the present disclosure may add new context to the existing universe of data and information stored on the Internet.

According to various aspects, the architecture 100 associated with the context engine may include various modules that may implement appropriate algorithms to provide analytic tools to help users and applications to analyze and investigate the events 101 that are modeled via the event lens. More particularly, as will be described in further detail below with reference to FIG. 3, a circumstance affinity selection module 110 may be configured to sequentially suggest and build dimensional affinity through several dimensions, thereby allowing new events 101 to be researched and documented. Furthermore, as will be described in further detail below with reference to FIG. 4, a circumstance synonymous value concordance module 120 may be appropriately invoked (e.g., by a user, an application, etc.) to identify, evaluate, and recommend candidate circumstance values to determine equivalent, nested, and/or proximate relationships between circumstance values in a single circumstance dimension. As will be described in further detail below with reference to FIG. 5, the architecture 100 may further comprise an event association score module 130 that can locate events 101 having close dimensional alignment, and assess the affinity of each dimension such that event-to-event association ratings and relationships can be assigned and established. As will be described in further detail below with reference to FIG. 6, an event veracity score module 140 may further provide the ability to determine the truthfulness of any given event 101 based on whether any empirical evidence exists to the contrary. In various use cases, when there is contrary empirical evidence associated with a given event 101, the event veracity score module 140 may further assess the empirical evidence to develop a veracity rating related to the truthfulness of the event 101. Further still, as will be described in further detail with reference to FIG. 7, an event inferred circumstance candidate module 150 may be suitably invoked to identify, evaluate, and recommend potential circumstance values that may complete the five dimension definition of a given event 101.

Accordingly, as will be apparent to those skilled in the art, the context engine as described herein may provide an inverted approach to information exploration, building up from specific circumstances as opposed to unstructured "big data" associations. For example, in contrast to the conventional Internet structure whereby raw data is sorted into web pages and loosely tagged with metadata, the context engine described herein may provide structure and logical semantic meaning to the circumstances associated with the events 101 that are modeled in the underlying architecture 100. As such, the context engine may provide an information analysis system that integrates a logical semantic circumstances structure having significant philosophical and historical foundations, i.e., Who, What, Where, When, Why, and How, which may provide the ability to identify, associate, validate, and anticipate facts related to the events 101 using a structured context. The context engine may therefore be used to support various suitable information analysis use cases, such as providing a space to allow people to collaborate, seek truth, find others with common interests, and debate the interpretation of events 101, among other things. Unlike conventional social media platforms, the context engine may be designed to not create an "echo chamber" because every user's experience will present the same facts and the basis for which a given fact may be subject to debate. Furthermore, as a living and evolving body of knowledge, the events 101 that are modeled via the event lens 190 may be monetized in various ways. For example, human users could opt in to traditional click-through advertisements that are focused on the issues that the users are searching or building. Other users may subscribe to predictive capabilities or other specific analytic functions, subscribe to notifications regarding certain changes in the underlying data model, and so on. In still another use case, certain users or organizations (e.g., law firms, intelligence agencies, journalists, law enforcement, etc.) may purchase the context engine as a software service to implement a so-called "walled garden" to develop insights and analytic findings in isolation from other users. Accordingly, the context engine described herein may have various applications and ramifications in areas related to knowledge, understanding, politics, business, governance, accountability, privacy, personal security, etc.

Figure 2A:
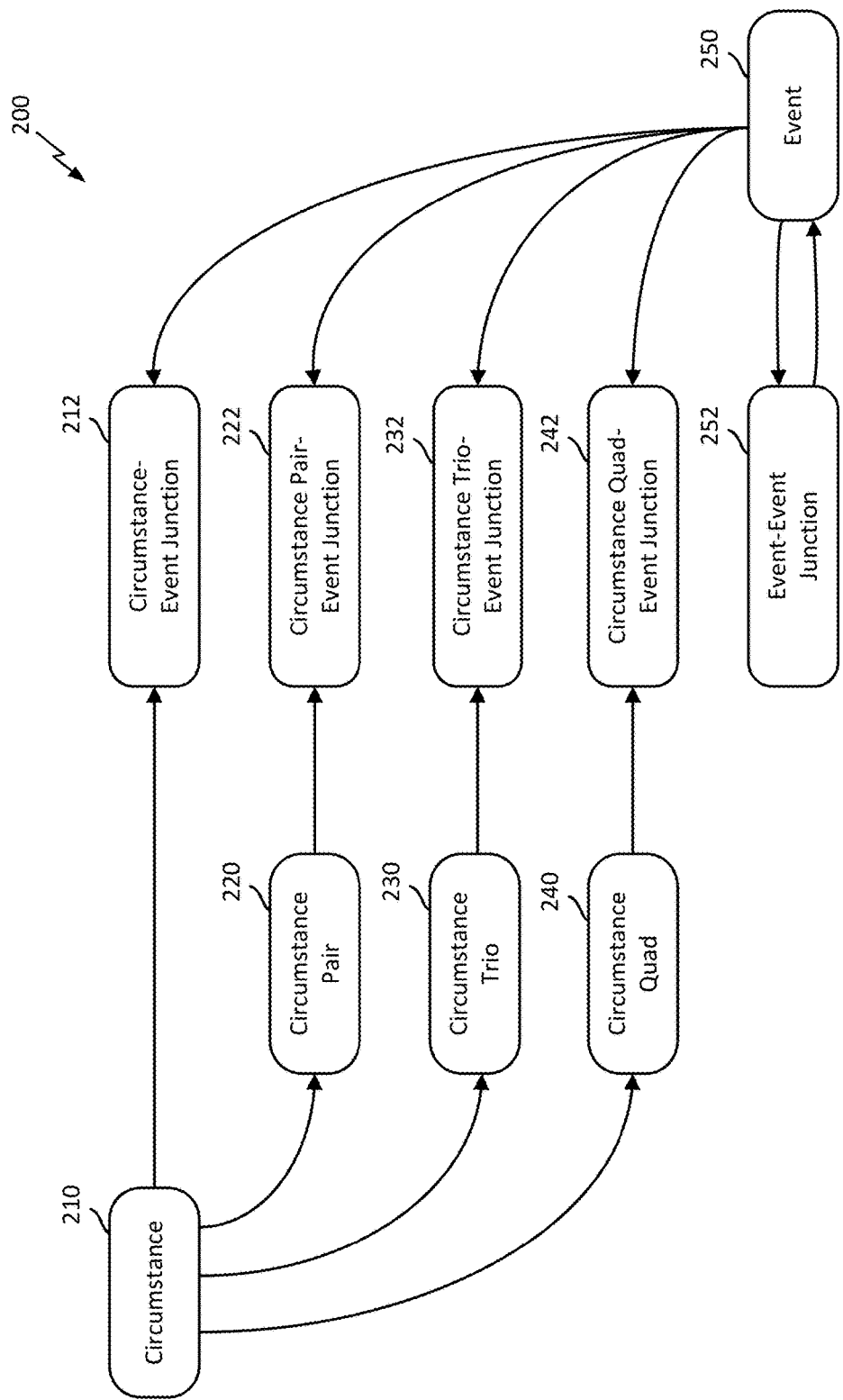
FIG. 2A illustrates an exemplary circumstance-event relationship model that may provide a structure and enable capabilities of a circumstance-event lens that has dimensional grouping capabilities, according to various aspects.
Figure 2B:
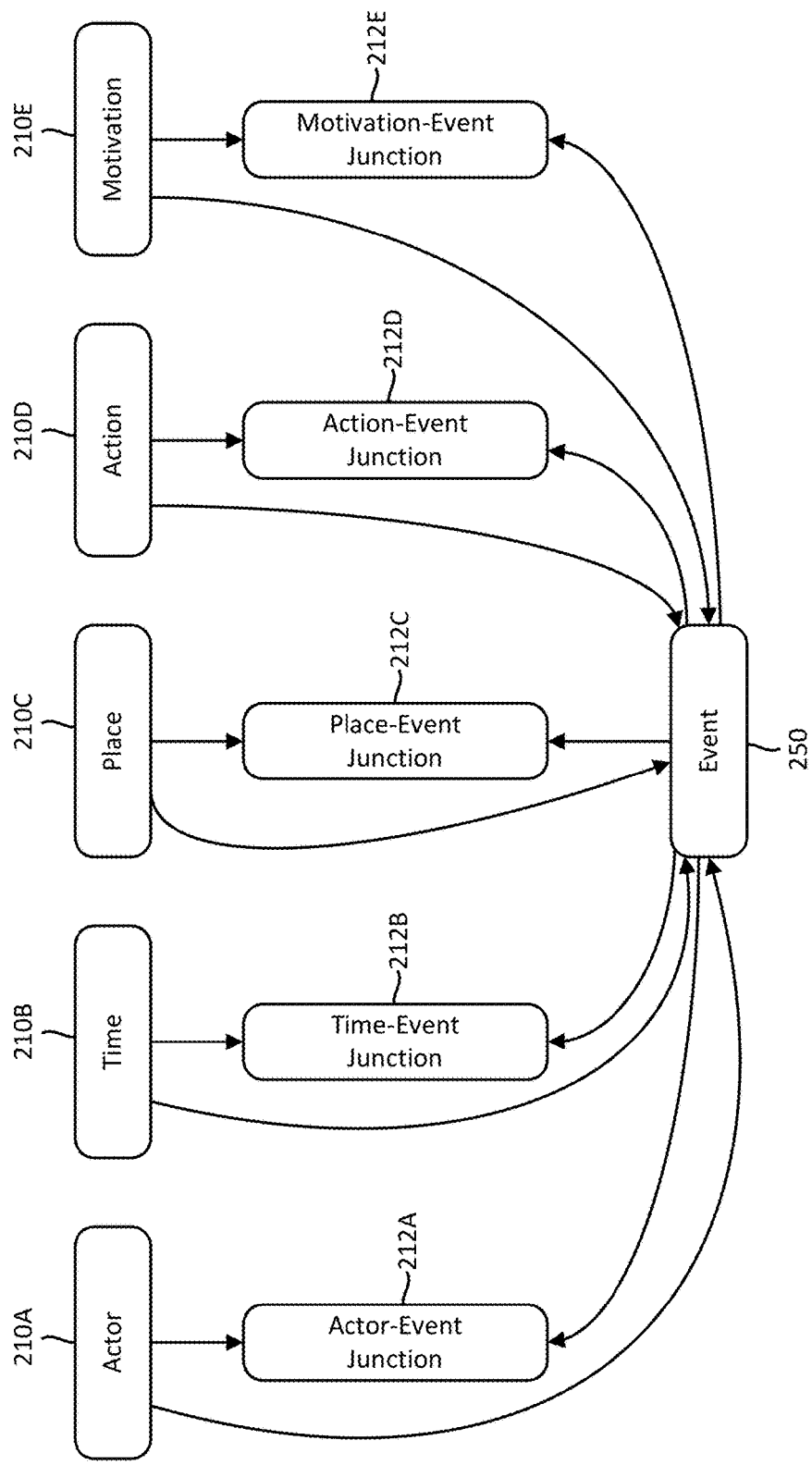
FIG. 2B illustrates an exemplary circumstance-to-event relationship model, which may be used to navigate the circumstance-event lens along a single event dimension, according to various aspects.

According to various aspects, having given the above high-level overview of the context engine, an exemplary circumstance-event relationship model 200 that may be used in the context engine will now be described with reference to FIG. 2A-2F. In general, the circumstance-event relationship model 200 may be used to document the structure, relationships, and logical semantics associated with various circumstances 210 and related events 250 and enable various processing algorithms to navigate and interpret that information. In FIG. 2A, the circumstance-event relationship model 200 may define a logical structure for database information that instantiates the logical semantic structure of the circumstances 210 associated with each event 250 and provide a context and meaning to help understand relationships between the events 250. The essential structure framework starts with tables for each of five circumstance dimensions 210. For example, as shown in FIG. 2B, the circumstance dimensions 210 may include an actor circumstance 210A to represent the Who associated with an event 250, a time circumstance 210B to represent the When associated with the event 250, a place circumstance 210C to represent the Where associated with the event 250, an action circumstance 210D to represent the What associated with the event 250, and a motivation circumstance 210E to represent the Why associated with the event 250. Furthermore, a consolidation table may be used for events 250 based on the specific and unique set of five circumstances 210 that define each individual event 250. From this set of baseline tables, various junction tables and table relationships may allow the modeled data to be queried, retrieved, investigated, analyzed and documented according to values related to one or more circumstances 210 or combinations of circumstances 210.

Figure 2D:
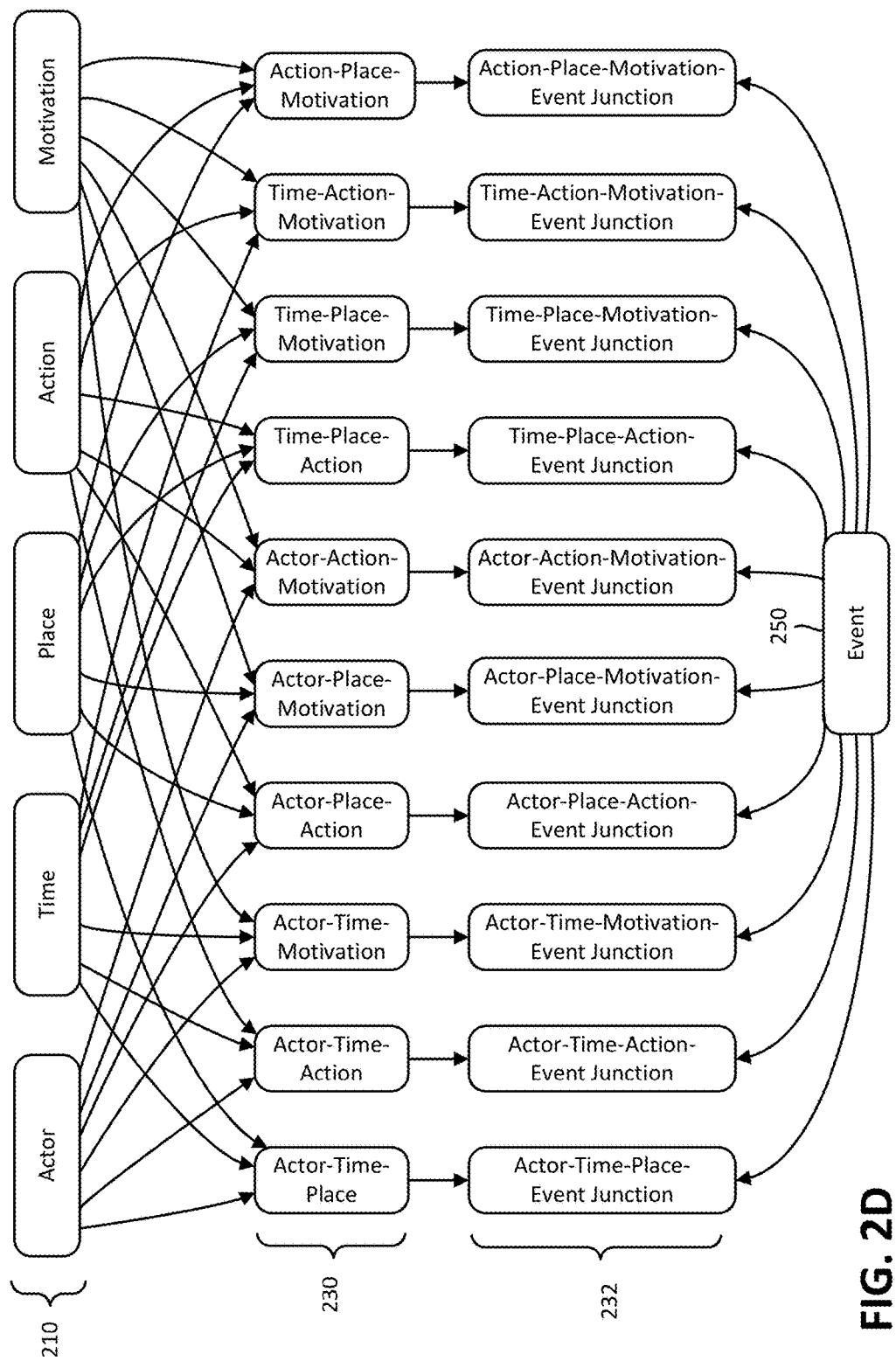
FIG. 2D illustrates an exemplary circumstance trio-to-event relationship model, which may be used to navigate the circumstance-event lens along three event dimensions, according to various aspects.
Figure 2E:
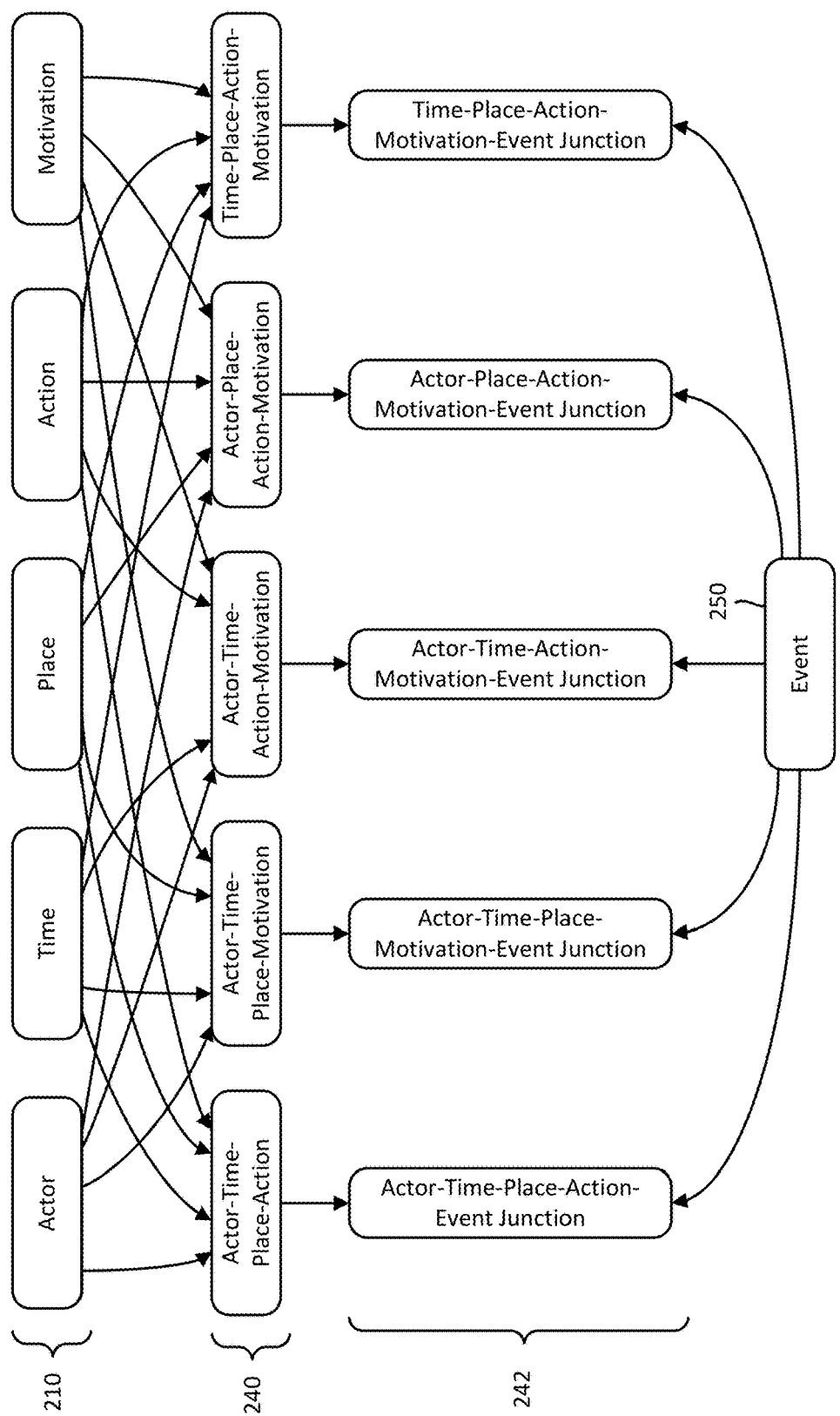
FIG. 2E illustrates an exemplary circumstance quartet-to-event relationship model, which may be used to navigate the circumstance-event lens along four event dimensions, according to various aspects.
Figure 2F:
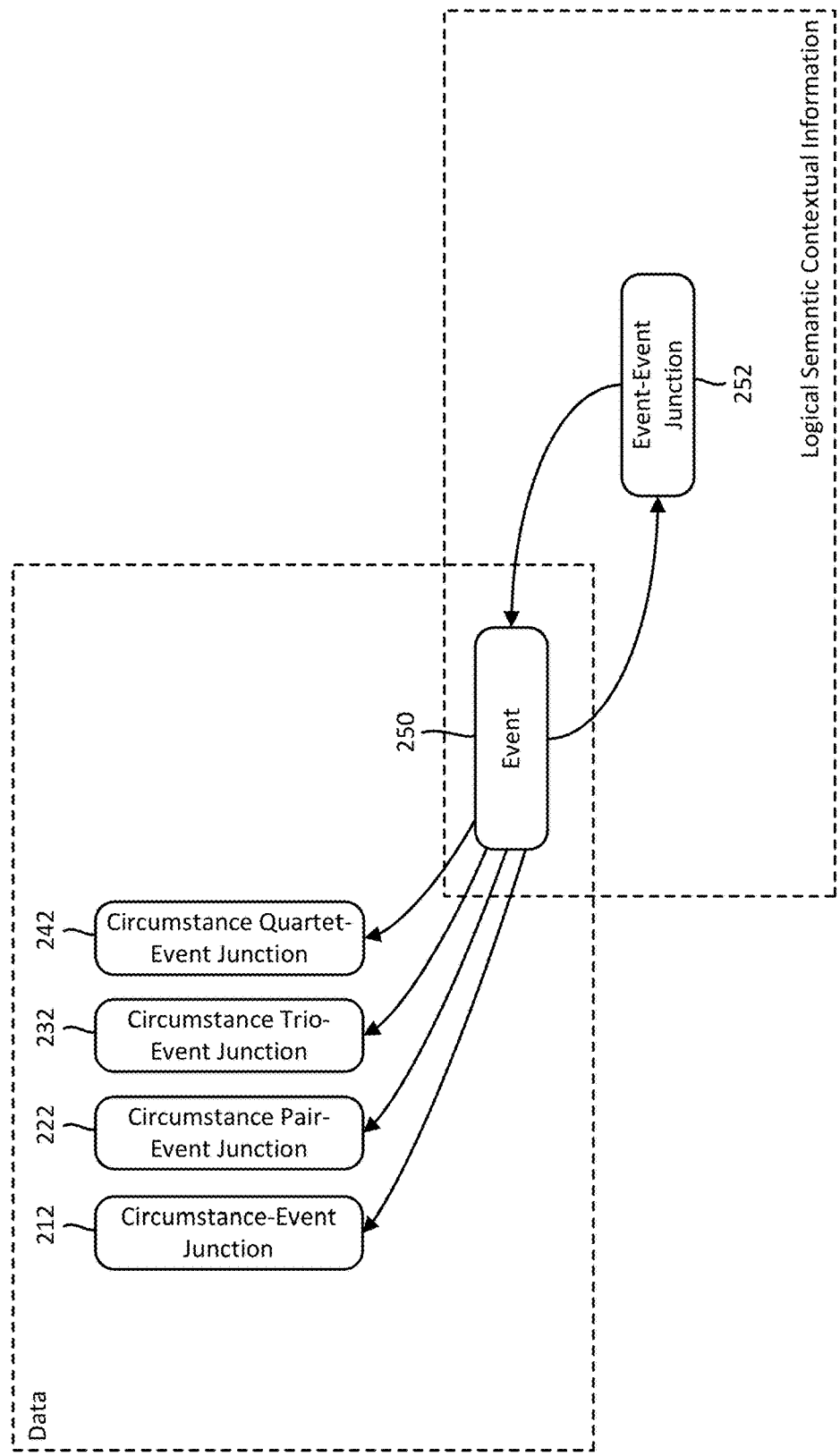
FIG. 2F illustrates an exemplary five circumstance relationship model that may provide a five-dimensional point of entry into the circumstance-event lens and a mechanism to capture and document event associations, according to various aspects.

The linkage and navigational mechanisms, which are generally illustrated in FIG. 2A through FIG. 2F, may be used to create and understand links between circumstances 210 and events 250 according to combinations of circumstance pairs 220 based on two shared circumstances, circumstance trios 230 based on three shared circumstances, and circumstance quads 240 based on four shared circumstances. As shown in FIG. 2A, each individual circumstance 210 may be associated with a given event 250 via a circumstance-event junction 212. For example, as further shown in FIG. 2B, the actor circumstance 210A may be associated with an event 250 via an actor-event junction 212A, the time circumstance 210B may be associated with the event 250 via a time-event junction 212B, the place circumstance 210C may be associated with the event 250 via a place-event junction 212C, the action circumstance 210D may be associated with the event 250 via an action-event junction 212D, and the motivation circumstance 210E may be associated with the event 250 via a motivation-event junction 212E. Furthermore, FIG. 2A in combination with FIG. 2C shows that each circumstance pair 220 is associated with the event 250 via a circumstance pair-event junction 222, FIG. 2A in combination with FIG. 2D shows that each circumstance trio 230 is associated with the event 250 via a circumstance trio-event junction 232, FIG. 2A in combination with FIG. 2E shows that each circumstance quad 240 is associated with the event 250 via a circumstance quad-event junction 242, and FIG. 2A in combination with FIG. 2F shows that the event 250 may be associated with one or more other events via an event-event junction 252.

The relationship model (including database tables and database relationships involving circumstances and events) is fully dependent upon the various combinations that are possible given the number of circumstance dimensions are that are known and defined with specific values. For each set of possible combinations when one, two, three, four or five of the circumstances is known a set of database structures provides the ability to document, navigate, and analyze the respective set of possible combinations, with the number of possible combinations is defined by the formula:

$$C(n, k) = \frac{n!}{(n-k)! * k!},$$

where C is the number of possible combinations, n is the total possible circumstances dimensions (5) and k is the number of known and defined circumstances (from 1 to 5). Using this formula, there are five (5) possible combinations of circumstance sets when there is one (1) known circumstance, ten (10) possible combinations of circumstance sets when there are two (2) known circumstances, ten (10) possible combinations of circumstance sets when there are three (3) known circumstances, five (5) possible combinations of circumstance sets when there are four (4) known circumstances, and one (1) possible combination of circumstance sets when there are five (5) known circumstances (which assumes that 0! is defined to equal one). Accordingly, in various embodiments, the data model described herein has various logical tables and various relationships to represent this universe of potential combinations.

For example, in the logical semantic structure where five circumstances 210 are used, including actor 210A, time 210B, place 210C, action 210D, and motivation 210E, there would five (5) different combinations of two circumstances, ten (10) different combinations of three circumstances, ten (10) different combinations of four circumstances and one (1) possible combination of five circumstances. These combination permutations are the foundation of the circumstance-event relationship model 200 and illustrate the size and scope of the logical structures that the context engine described herein may provide to access and understand circumstance context. In particular, referring to the following table, the specific conceptual logical elements of the circumstance-event relationship model 200 as illustrated in FIG. 2A-2F includes thirty-one (31) primary tables to document event, circumstance, and circumstance combinations, thirty-one (31) junction tables to link the primary tables, and one hundred thirty-seven (137) relationships between the primary tables and the junction tables.

TABLE 1

Circumstance-to-Event Relationship Elements

| FIG. | Primary Tables | Junction Tables | Table Relationships | Relationship Characteristics |
|---|---|---|---|---|
| 2B | 5 | 5 | 15 | Referencing individual circumstances |
| 2C | 10 | 10 | 40 | Relating circumstance pairs |
| 2D | 10 | 10 | 50 | Relating circumstance trios |
| 2E | 5 | 5 | 30 | Relating circumstance quads |
| 2F | 1 | 1 | 2 | Documenting full event circumstances |

For example, referring to FIG. 2B, each of the actor circumstance 210A, the time circumstance 210B, the place circumstance 210C, the action circumstance 210D, and the motivation circumstance 210E may be associated with one primary table, resulting in five (5) total primary tables. Furthermore, the primary table for each individual circumstance 210 may point to the associated event 250 and to a respective circumstance-event junction 212, whereby the primary tables in FIG. 2A may include ten (10) total table relationships. Further still, each of the circumstance-event junctions 212 may be associated with one junction table to relate an individual circumstance 210 to the event 250, resulting in five (5) junction tables that define five (5) table relationships. Accordingly, relationships between a particular event 250 and individual circumstances 210 may be appropriately modeled using five (5) primary tables and five (5) junction tables that collectively document fifteen (15) table relationships.

Referring now to FIG. 2C, relationships between the event 250 and various circumstance pairs 220 may be appropriately modeled using ten (10) primary tables, ten (10) junction tables, and forty (40) table relationships. In particular, each of ten (10) circumstance pairs 220 may be associated with a primary table to capture relationships between two circumstances 210 and each of ten (10) circumstance pair-event junctions 222 may be associated with a junction table to relate the circumstance pairs 320 to the event 250. Furthermore, the various arrows shown in FIG. 2C may each represent one (1) table relationship, whereby ten (10) primary tables, ten (10) junction tables, and forty (40) table relationships may effectively model relationships between the event 250 and any suitable circumstance pair 220 based on two shared circumstances 210.

Referring now to FIG. 2D, relationships between the event 250 and various circumstance trios 230 may be appropriately modeled using ten (10) primary tables, ten (10) junction tables, and fifty (40) total table relationships. In particular, each of ten (10) circumstance trios 230 may be associated with a primary table to capture relationships between three circumstances 210 and each of ten (10) circumstance trio-event junctions 232 may be associated with a junction table to relate the circumstance trios 230 to the event 250. Furthermore, the various arrows shown in FIG. 2D may again represent one (1) table relationship each, whereby ten (10) primary tables, ten (10) junction tables, and fifty (50) table relationships may model relationships between the event 250 and any suitable circumstance trio 230 based on three shared circumstances 210.

Referring now to FIG. 2E, relationships between the event 250 and various circumstance quads 240 may be appropriately modeled using five (5) primary tables, five (5) junction tables, and thirty (30) total table relationships. In particular, one primary table may be associated with each of five (5) circumstance quads 240 to capture relationships between four circumstances 210 and each of five (10) circumstance quad-event junctions 242 may be associated with a junction table to relate the circumstance quads 240 to the event 250. The various arrows in FIG. 2E may similarly represent one (1) table relationship each, whereby five (5) primary tables, five (5) junction tables, and thirty (30) table relationships may model relationships between the event 250 and any suitable circumstance quad 240 based on four shared circumstances 210.

Referring now to FIG. 2F, a relationship between the event 250 and another individual event (not explicitly shown) may be modeled using one (1) primary table, one (1) junction table, and two (2) total table relationships. In particular, the primary table may be associated with the event 250 to document the event-to-event junction 252 defining the relationship to the other individual event. In addition, the event-to-event junction 252 may be associated with the junction table to provide the link to the other event. The remaining junctions 212, 222, 232, 242 are shown to represent the circumstantial data associated with the event 250, wherein the junctions 212, 222, 232, 242 shown in FIG. 2F are associated with the junction tables described above with respect to FIG. 2B through FIG. 2E. The essential innovation that enables the definition and utilization of contextual semantic meaning for circumstances 210 and events 250 is the integrated and operational data structure that provides the mechanism to navigate and explore the content and relationships between multiple circumstances 210 and associated events 250. Based on the foregoing, the specific elements of the circumstance-event relationship model 200 include sixty-two (62) tables and one hundred thirty-seven (137) relationships as detailed below.

| Core Primary Tables (6) |
|---|
| Actor (Who) |
| Time (When) |
| Place (Where) |
| Action (What) |
| Motivation (Why) |
| Event |

| Circumstance Pair Primary Tables (10) |
|---|
| Actor-Time |
| Actor-Place |

| Circumstance Pair Primary Tables (10) |
| --- |
| Actor-Action |
| Actor-Motivation |
| Time-Place |
| Time-Action |
| Time-Motivation |
| Action-Place |
| Action-Motivation |
| Motivation-Place |

| Circumstance Trio Primary Tables (10) |
| --- |
| Actor-Time-Place |
| Actor-Time-Action |
| Actor-Time-Motivation |
| Actor-Place-Action |
| Actor-Place-Motivation |
| Actor-Action-Motivation |
| Time-Place-Action |
| Time-Place-Motivation |
| Time-Action-Motivation |
| Action-Place-Motivation |

| Circumstance Quad Primary Tables (5) |
| --- |
| Actor-Time-Place-Action |
| Actor-Time-Place-Motivation |
| Actor-Time-Action-Motivation |
| Actor-Place-Action-Motivation |
| Time-Place-Action-Motivation |

| Core Junction Tables (6) |
| --- |
| Actor-Event Junction |
| Time-Event Junction |
| Place-Event Junction |
| Action-Event Junction |
| Motivation-Event Junction |
| Event-Event Junction |

| Circumstance Pair Junction Tables (10) |
| --- |
| Actor-Time-Event Junction |
| Actor-Place-Event Junction |
| Actor-Action-Event Junction |
| Actor-Motivation-Event Junction |
| Time-Place-Event Junction |
| Time-Action-Event Junction |
| Time-Motivation-Event Junction |
| Action-Place-Event Junction |
| Action-Motivation-Event Junction |
| Motivation-Place-Event Junction |

| Circumstance Trio Junction Tables (10) |
| --- |
| Actor-Time-Place-Event Junction |
| Actor-Time-Action-Event Junction |
| Actor-Time-Motivation-Event Junction |
| Actor-Place-Action-Event Junction |
| Actor-Place-Motivation-Event Junction |
| Actor-Action-Motivation-Event Junction |
| Time-Place-Action-Event Junction |
| Time-Place-Motivation-Event Junction |
| Time-Action-Motivation-Event Junction |
| Action-Place-Motivation-Event Junction |

| Circumstance Quad Junction Tables (5) |
| --- |
| Actor-Time-Place-Action-Event Junction |
| Actor-Time-Place-Motivation-Event Junction |
| Actor-Time-Action-Motivation-Event Junction |
| Actor-Place-Action-Motivation-Event Junction |
| Time-Place-Action-Motivation-Event Junction |

| Table Relationships (137) |
| --- |
| Circumstance-to-Event (5) |
| Circumstance-to-Circumstance Pair (20) |
| Circumstance-to-Circumstance Trio (30) |
| Circumstance-to-Circumstance Quad (20) |
| Circumstance-to-Circumstance-Event Junction (5) |
| Circumstance Pair-to-Circumstance Pair-Event Junction (10) |
| Circumstance Trio-to-Circumstance Trio-Event Junction (10) |
| Circumstance Quad-to-Circumstance Quad-Event Junction (5) |
| Event-to-Circumstance-Event Junction (5) |
| Event-to-Circumstance Pair-Event Junction (10) |
| Event-to-Circumstance Trio-Event Junction (10) |
| Event-to-Circumstance Quad-Event Junction (5) |
| Event-to-Event (2) |

The aforementioned structures are logical models and definitions that could be implemented in various database alternatives. For example, in one physical implementation, a fully normalized Structured Query Language (SQL) relational database would be possible. However, the optimum physical data structures and toolsets that will provide suitable technological capabilities may vary depending on volume constraints, performance constraints, and/or other factors. In any case, the implementation of each table in the circumstance-event relationship model 200 may have a unique and specific key structure for that respective table. For example, in one embodiment, the key to the single circumstance tables may be a numerical representation of the specific value of the circumstance entry. The key to the multiple dimension circumstance tables may be a concatenated compound key based on the combination of circumstances in a structure of five concatenated numbers, wherein the key value(s) for the included circumstance(s) are used and a zero (0) is used to represent the non-included circumstance(s). For example, the structure "circumstance-key.0.0.circumstance-key.0" may be used to represent a combination of two circumstances in the first and fourth position with zeroes representing the non-included circumstances in the second, third, and fifth position. The key to the event tables may be a fully populated concatenated key that contains all the five circumstance keys for the circumstances that define the event in the manner of "circumstance-key.circumstance-key.circumstance-key.circumstance-key.circumstance-key". Those skilled in the art will appreciate that although database technologies focused on massive scale, distributed deployment, parallel processing and query result acceleration are emerging and evolving, variations of physical model deployment do not change the essential structure or innovation of the underlying logical models as described herein.

Figure 3:
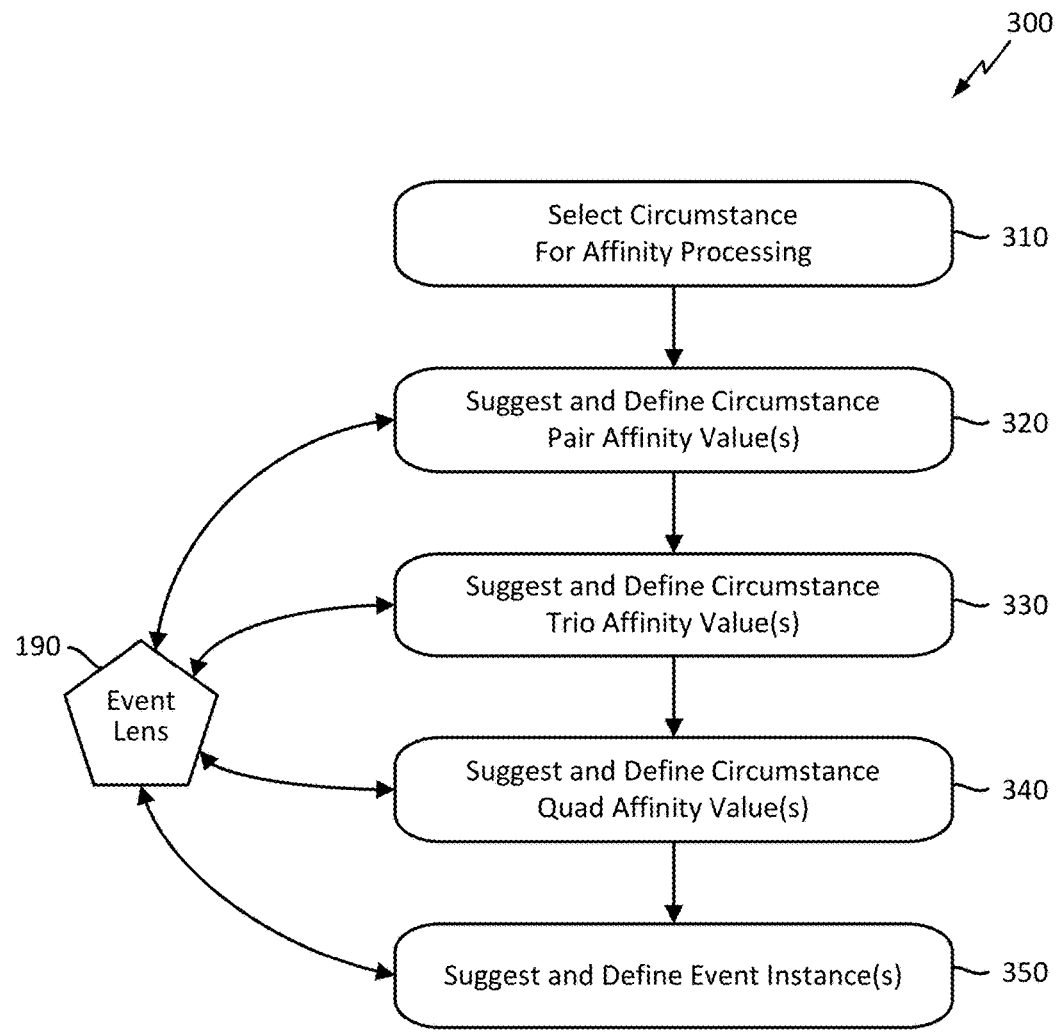
FIG. 3 illustrates exemplary circumstance affinity selection processing through which dimensional affinity may be suggested and events may be built up sequentially through several dimensions, according to various aspects.

According to various aspects, referring now to FIG. 3, an exemplary circumstance affinity selection method 300 as illustrated therein may be used to suggest dimensional affinity and sequentially build events through several dimensions. For example, referring back to FIG. 1, the circumstance affinity selection method 300 may be implemented via the circumstance affinity selection module 110, which may receive inputs from the circumstance and event entry user interface 170 and/or data from the event lens 190 that is used to store the data used to model the circumstances associated with various events. As such, the circumstance affinity selection method 300 may be invoked using an appropriate application via a specific request and provide interactive suggestions to support a user with a specific use case to research and document new events. Furthermore, information that the circumstance affinity selection method 300 generates (e.g., new event instances or circumstance values) may be used to update the data stored in the event lens 190, as described in further detail herein. For example, at a high-level, the circumstance affinity selection method 300 may allow a user to hold one Five-W event circumstance constant and select a second related Five-W event circumstance variable as independent to reveal one or more relationships between the constant circumstance, the selected independent circumstance variable, and all other Five-W dependent circumstances that are associated with the event and other related events. As such, these and other capabilities described herein may allow users to aggregate and interpret the underlying data in new and innovative ways. The various aspects and embodiments described herein may thereby provide a substantive, intuitive, scalable, and searchable layer of context to the universe of data and information on the Internet, and will add new knowledge and understanding to events in literature, human history, and/or other suitable contexts.

More particularly, referring to FIG. 3, the circumstance affinity selection method 300 may initially comprise selecting one specific circumstance for affinity processing at block 310 (e.g., an actor, a time, a place, an action, or a motivation associated with a given event). In response to selecting the circumstance value to be investigated, a circumstance pair affinity may be suggested and defined at block 320. For example, the modeled data available via the event lens 190 may be used to retrieve circumstance pairs that are associated with the selected circumstance along with the circumstance pair entries for the selected circumstance and the other four circumstances. For each of the four sets of circumstance pairs, the number of event junctions that contain that pairing may be inventoried. For each circumstance pair, the N-best values may be suggested based on inventory counts for that circumstance pairing (e.g., the top three values, although those skilled in the art will appreciate that another suitable number of top values may be employed). The user may then accept the suggestion or enter a new value for the pairing of the original selected circumstance and one additional circumstance dimension (i.e., a second circumstance dimension).

According to various embodiments, at block 330, a circumstance trio affinity may then be suggested and defined based on the circumstance pair defined at block 320. For example, the modeled data available via the event lens 190 may be used to retrieve the circumstance trio junctions that are associated with the current circumstance pair and for the remaining three circumstances. For the population of events containing each circumstance trio, the number of event junctions that contain that trio may be inventoried. As such, for each circumstance trio, the N-best values may be suggested based on inventory counts for that circumstance trio, whereby the user may then accept the suggestion or enter a new value to associate the current circumstance pair with an additional (i.e., third) circumstance dimension.

According to various embodiments, at block 340, a circumstance quad affinity may then be suggested and defined based on the circumstance trio defined at block 330. Once again, the modeled data available via the event lens 190 may be used to retrieve the circumstance quad junctions that are associated with the current circumstance trio and for the remaining two circumstances. For the population of events containing each circumstance quad, the number of event junctions that contain that quad may be inventoried. As such, for each circumstance quad, the N-best values may be suggested based on inventory counts for that circumstance quad, whereby the user may then accept the suggestion or enter a new value to associate the current circumstance trio with an additional (i.e., fourth) circumstance dimension.

According to various embodiments, at block 350, an event instance may then be suggested and defined based on the circumstance quad as defined at block 340. In particular, the modeled data available via the event lens 190 may be used to retrieve various events such that for the population of events containing each circumstance quad, the number of event junctions that contain that circumstance quad may be inventoried. For each circumstance quad, the N-best values may be suggested based on inventory counts for that circumstance quad, whereby the user may then either confirm the event suggestion and continue to event association analysis or determine a new circumstance value to enter for the last circumstance before submitting the new event to the database.

Figure 4:
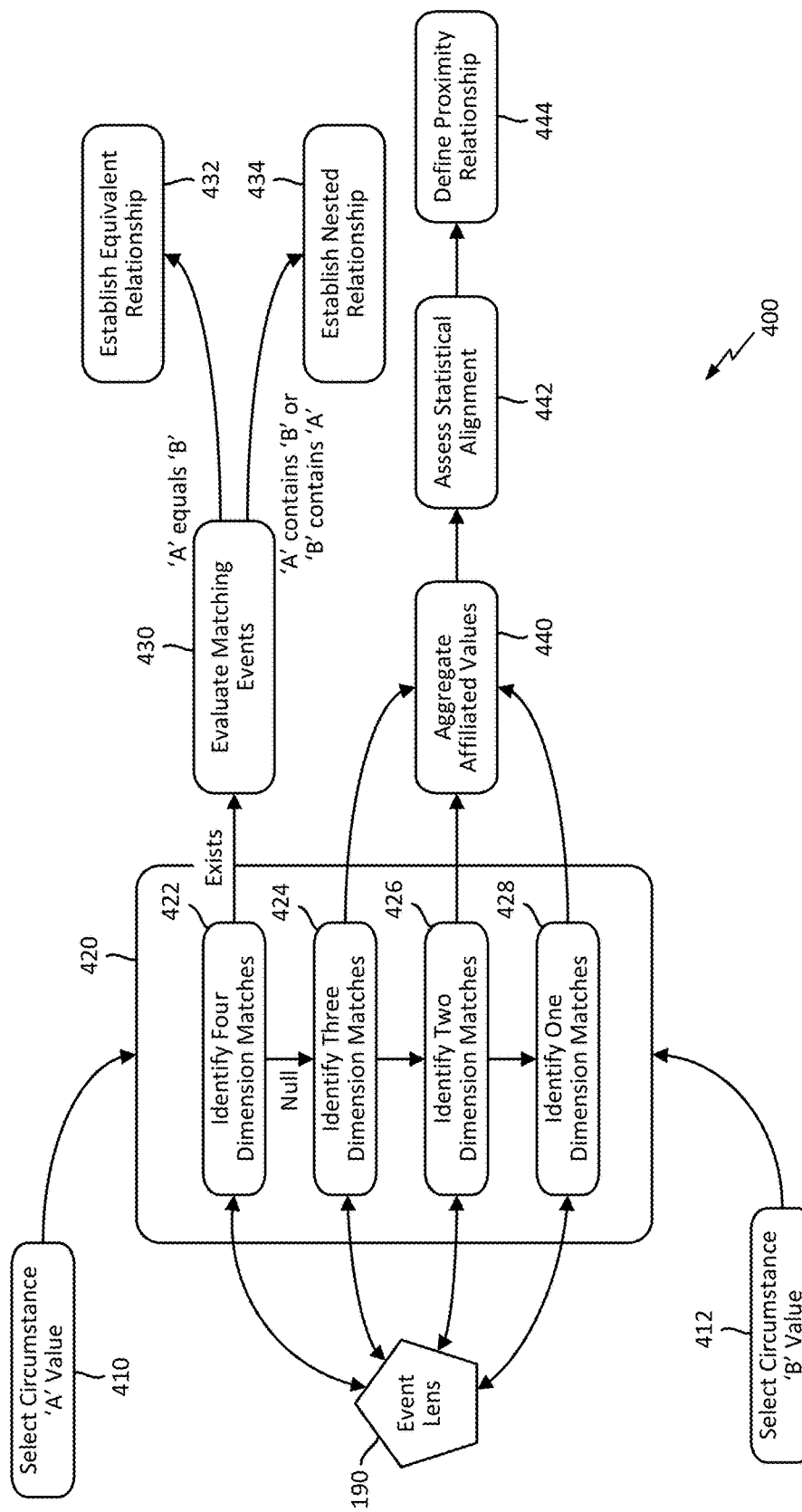
FIG. 4 illustrates exemplary circumstance synonymous value concordance processing to determine equivalent, nested, and/or proximate relationships between circumstance values in a single circumstance dimension, according to various aspects.

According to various aspects, referring now to FIG. 4, an exemplary circumstance synonymous value concordance method 400 as illustrated therein may be used to determine equivalent, nested, and/or proximate relationships between circumstance values in a single circumstance dimension. For example, referring back to FIG. 1, the circumstance synonymous value concordance method 400 may be implemented via the circumstance synonymous value concordance module 120, which may operate on the data used to model the circumstances associated with various events via interaction with the event lens 190. As such, the circumstance synonymous value concordance method 400 may be invoked using an appropriate application to evaluate certain circumstance values for meaning alignment, as described in further detail herein.

More particularly, referring to FIG. 4, the circumstance synonymous value concordance method 400 may initially comprise selecting a first specific value for a given circumstance dimension that is to be evaluated for meaning alignment at block 410. For example, in various embodiments, the selected value may be for the actor, time, place, action, or motivation circumstance associated with a given event. Furthermore, at block 412, a second value may be selected for the same circumstance dimension that is to be evaluated for meaning alignment (hereinafter referred to as the "current" circumstance dimension). In various embodiments, at block 420, the event lens 190 may then be used to identify N-dimension matches for the first value and the second value for the current circumstance dimension. In particular, at block 422, the event lens 190 may be used to identify a set of four dimension matches, which may include events that contain the selected values for the current circumstance dimension and have identical values for the other four circumstance dimensions. In a similar respect, at block 424, the event lens 190 may be used to identify a set of four dimension matches, which may include events that contain the selected values for the current circumstance dimension and have identical values for the other four circumstance dimensions. In a similar respect, a set of three dimension matches may be identified at block 424 (e.g., events that contain the selected circumstance values and have identical values for each possible combination of three other circumstance dimensions), a set of two dimension matches may be identified at block 426 (e.g., events that contain the selected circumstance values and have identical values for each possible combination of two other circumstance dimensions), and a set of one dimension matches may be identified at block 428 (e.g., events that contain the selected circumstance values and have identical values for at least one of the other circumstance dimensions).

In various embodiments, assuming that block 422 returns a non-zero set of four circumstance dimensions, the set of four dimension matches may be evaluated at block 430 for each of the two selected values for the current circumstance dimension to determine whether the sets are equal or fully contained in the other set. When the events in the sets of four dimension matches for each of the selected values for the current circumstance dimension are functionally identical, an equivalent relationship may be established at block 432. Accordingly, the equivalent relationship may indicate that the first value for the current circumstance dimension and the second value for the current circumstance dimension are substantially synonymous and have a functionally identical contextual meaning. However, when the events in the set of four dimension matches for one of the selected circumstance values are substantially contained within the events in the set of four dimension matches for the other circumstance value, a nested relationship may be established at block 434. Accordingly, the nested relationship may indicate that the first circumstance value is a subset of the second circumstance value (or vice versa depending on which event set contains the other).

In various embodiments, returning to block 422, there may be no matching events for the two selected circumstance values when there is a null set of four circumstance dimensions. In such cases, block 440 may comprise aggregating the affiliated values for the three dimension matches, the two dimension matches, and the one dimension matches identified at blocks 424, 426, 428. In particular, the three, two, and one dimension matches may be consolidated into two consolidated value sets, including one for each selected value for the current circumstance dimension. In various embodiments, at block 442, the consolidated sets for each of the selected circumstance values may be compared to assess a statistical alignment among the two consolidated sets. For example, in various embodiments, the statistical alignment may be based on a degree to which population bell curves for the matching values on the other dimensions match one another. Accordingly, at block 444, an order of magnitude proximity score may be assigned to define a proximity relationship between the first and second circumstance values based on the statistical level of alignment between the two sets.

Figure 5:
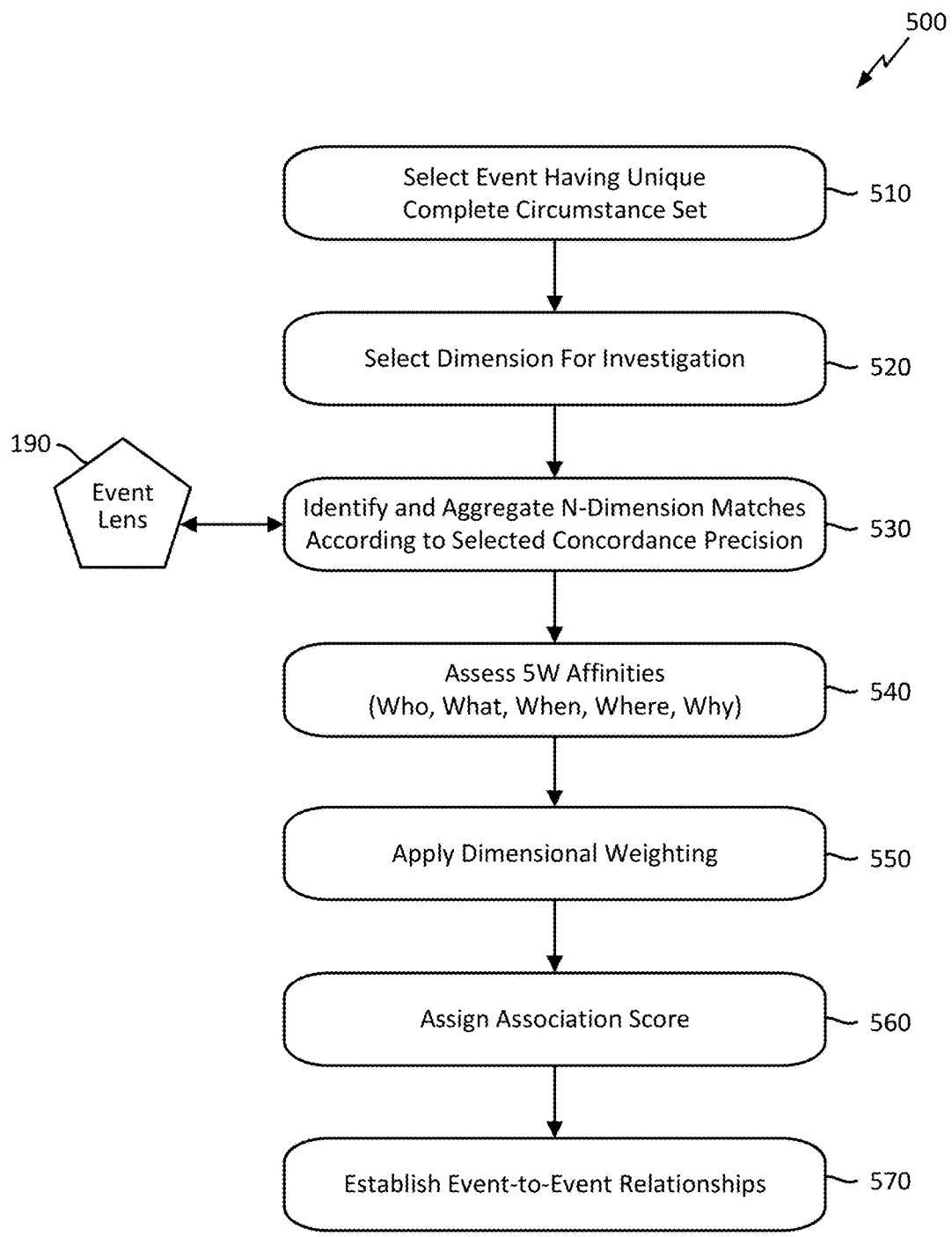
FIG. 5 illustrates exemplary event association score processing through which events with close dimensional alignment can be located and the affinity of each dimension can be assessed such that event-to-event association ratings and relationships can be assigned and established, according to various aspects.

According to various aspects, referring now to FIG. 5, an exemplary event association score method 500 as illustrated therein may be used to locate events with close dimensional alignment and assess the affinity of each dimension to assign and establish event-to-event association ratings and relationships. For example, referring back to FIG. 1, the event association score method 500 may be implemented via the event association score module 130, which may interact with the event lens 190 to operate on the data used to model the circumstances associated with various events. As such, the event association score method 500 may be invoked via the event analysis and investigation user interface 160 or another suitable application to identify and document the events having the greatest association with a selected event along each dimensional axis, as described in further detail herein.

More particularly, referring to FIG. 5, the event association score processing method 500 may initially comprise selecting one specific event that contains a unique set of all five circumstances at block 510. As such, the selected event may have a defined value for the actor, time, place, action, and motivation circumstances and the combination of circumstances may be unique in the sense that no other event has the same five circumstance values. In various embodiments, one of the five circumstances may be selected for further investigation at block 520, and N-dimension matches may be identified and aggregated according to a selected concordance precision at block 530. For example, as described in further detail above, the method 400 shown in FIG. 4 may be used to establish an equivalent, nested, or proximity relationship between two values for a given circumstance dimension. Accordingly, in various embodiments, the selected concordance precision used in block 530 may generally define a level of equivalence, nesting, and/or proximity that may be desired to determine that two given circumstance values are considered a contextual match. With respect to the N-dimension matches that are identified and aggregated at block 530, the event lens 190 may first be used to identify and select any four dimension matches, which may encompass any and all events that match the event that was selected at block 510 on the four dimensions other than the current dimension that was selected at block 520. In the event that no four dimension matches are identified, the event lens 190 may be used to identify and select any three dimension matches that may exist (i.e., events matching the selected event on three dimensions other than the current selected dimension), any two dimension matches that exist if no three dimension matches are identified (i.e., events matching the selected event on two dimensions other than the current selected dimension), or any one dimension matches that exist if there are no three dimension or two dimension matches.

In various embodiments, at block 540, the Five W affinities may be assessed based on the aggregated N-dimension matches (i.e., the consolidated set of all events that match the selected event on the highest number of dimensions). In particular, the consolidated matching events may be reviewed to assess an affinity between the selected event and each matching event with respect to the actor circumstance (Who), the action circumstance (What), the time circumstance (When), the place circumstance (Where), and the motivation circumstance (Why). Based on the respective circumstance affinities, an identity association rating, an action association rating, a temporal association rating, a location association rating, and a motivation association rating may be assigned to each event in the consolidated set of events. In various embodiments, a dimensional weighting may be applied at block 550, wherein a predefined weighting factor may be applied to each of the non-selected dimensions (i.e., the circumstance dimensions other than the dimension selected at block 520) to indicate the desired relevance for each circumstance dimension in the overall event association score. As such, block 560, a weighted association score may then be assigned to each of the candidate matching events, which may be sorted according to the level of association. Accordingly, at block 570, the event-event junction tables for the selected event (e.g., as shown in FIG. 2F) may be updated with the dimensional relationships and scores for the candidate events that have the highest level of association with the selected event.

Figure 6:
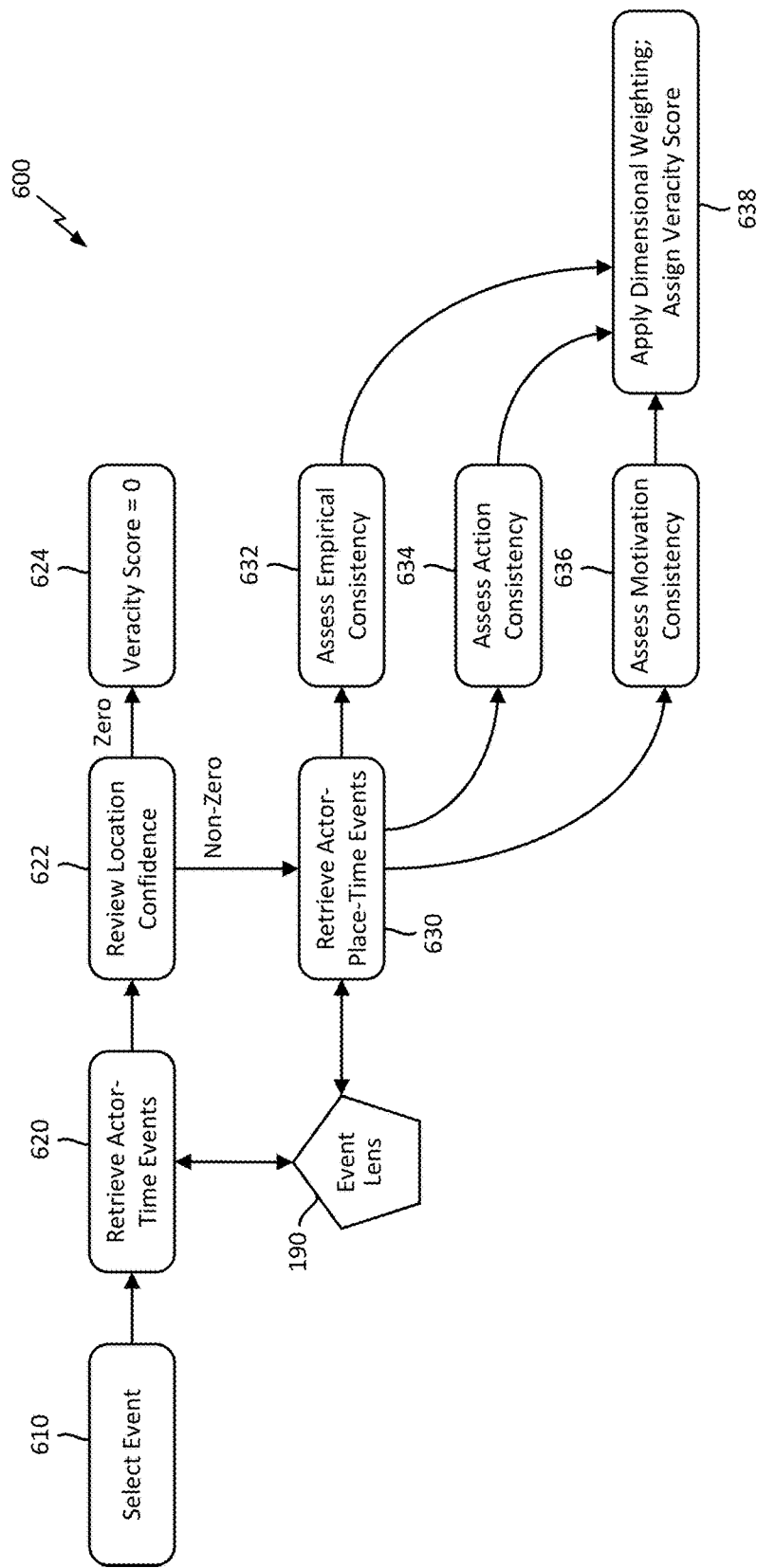
FIG. 6 illustrates exemplary event veracity score processing through which the truthfulness of any event can be determined based on whether any empirical evidence to the contrary exists and then, if necessary, assessing the empirical evidence to develop a veracity rating relating to the truthfulness of the event, according to various aspects.

According to various aspects, referring now to FIG. 6, an exemplary event veracity score method 600 as illustrated therein may be used to determine the truthfulness associated with any given event based on whether there is any empirical evidence to the contrary, and if so, to further assess the empirical evidence to develop a veracity rating relationship indicating the truthfulness of the event. For example, referring back to FIG. 1, the event veracity score method 600 may be implemented via the event veracity score module 140, which may interact with the event lens 190 to operate on the data used to model the circumstances associated with various events. As such, the event veracity score method 600 may be invoked via the event analysis and investigation user interface 160 or another suitable application to assess, evaluate and document the validity and truthfulness of an event, as described in further detail herein.

More particularly, referring to FIG. 6, the event veracity score method 600 may initially comprise selecting one specific event for which a veracity score is to be calculated at block 610, with the veracity score indicating a degree to which the selected event is considered to be valid and truthful. In various embodiments, at block 620, the event lens 190 may be used to retrieve any and all events that match the identity of the actor associated with the initially selected event and match the time when the initially selected event occurred. In other words, the events retrieved at block 620 may match the selected event along Who and When circumstance dimensions. In various embodiments, at block 622, a location confidence for the selected event may then be reviewed based on the set of events that match the selected event along the actor and time circumstance dimensions. More particularly, location entries associated with the events that have a matching actor-time circumstance pair may be reviewed at block 622 to determine whether any of the matching events have a high-confidence verified location that differs from the location associated with the selected event. In the situation where the location of an alternate event is confirmed (i.e., another event with the same actor-time circumstance pair and a different place circumstance with a high confidence value), an assumption can be made that the actor was in a different place at the time of the selected event. Accordingly, at block 624, confidence in the location associated with the selected event may be zero such that the veracity score for the selected event may be set to zero and returned to the requesting process, application, user, etc. while also updating the appropriate event databases.

In various embodiments, returning to block 622, the confidence in the location of the selected event may be a non-zero value in cases where other events with the same actor-time circumstance pair also have a matching location or a low confidence unverified differing location). In such cases, the event lens 190 may be used at block 630 to retrieve any and all events that match the initially selected event along the actor, place, and time dimensions. In various embodiments, at block 632, an empirical consistency score may be assigned based on an evaluation of the empirical dimension entries of the selected event against the population of all events containing a matching actor-place-time circumstance trio. Furthermore, at block 634, an action consistency score may be assigned to the selected event based on an evaluation of the action of the selected event against the population of all action circumstances for the same actor, and a motivation consistency score may be similarly assigned based on an evaluation of the motivation of the selected event against the population of all motivations for that actor.

In various embodiments, dimensional weighting may be applied to the empirical consistency score, the action consistency score, and the motivation consistency score may then be applied at block 638. In particular, a predefined weighing factor may be assigned to each circumstance dimension to account for the desired relevance of each circumstance dimension to the overall veracity score for the selected event. Accordingly, at block 638, the veracity score for the selected event may be assigned based on the empirical consistency score, the action consistency score, the motivation consistency score, and any dimensional weighting applied thereto. The assigned veracity score may then be returned to the requesting process, application, user, etc. and one or more event databases may also be updated to indicate the assigned veracity score.

Figure 7:
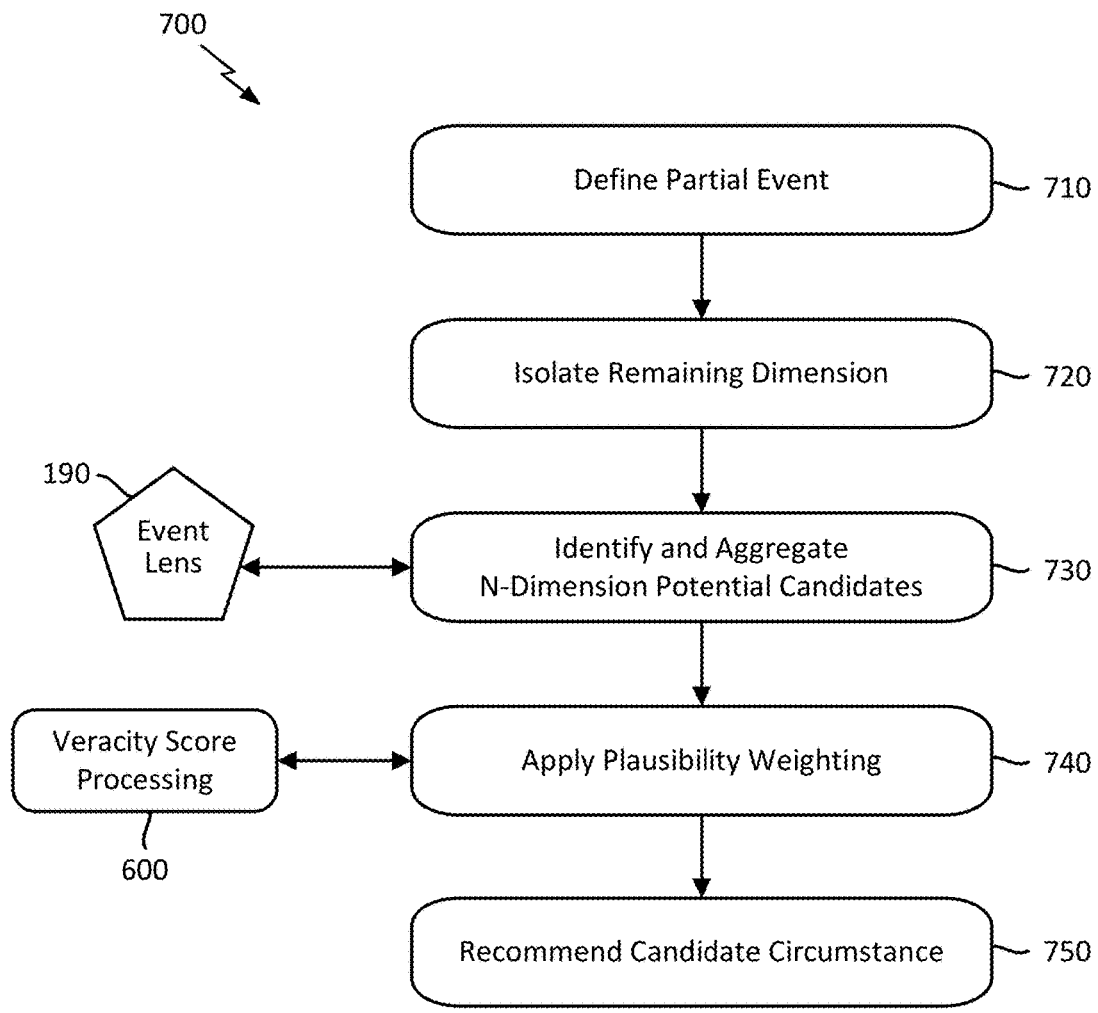
FIG. 7 illustrates exemplary event inferred circumstance candidate identification processing to identify, evaluate, and recommend potential circumstance values that may complete the five dimension definition of an event, according to various aspects.

According to various aspects, referring now to FIG. 7, an exemplary event inferred circumstance candidate method 700 as illustrated therein may be used to identify, evaluate, and recommend potential circumstance values that may complete the five dimension definition of an event. For example, referring back to FIG. 1, the event inferred circumstance candidate method 700 may be implemented via the event inferred circumstance candidate module 150, which may interact with the event lens 190 to operate on the data used to model the circumstances associated with various events. As such, the event inferred circumstance candidate method 700 may be invoked via the event analysis and investigation user interface 160 or another suitable application to identify, evaluate, and recommend candidate circumstance values for suggested incomplete event definitions, as described in further detail herein.

More particularly, referring to FIG. 7, the event inferred circumstance candidate method 700 may initially comprise selecting circumstances to create a partial event with specific values for four out of the five potential circumstance dimensions at block 710. In various embodiments, a remaining dimension may then be isolated at block 720 (i.e., the dimension without a specified value). In various embodiments, N-dimension potential candidates may then be identified and aggregated at block 730. For example, at block 730, the event lens 190 may be used to retrieve four dimension matches comprising events that have identical values for the four circumstance dimensions specified in the partial event, three dimension matches comprising events with identical values for each possible combination of three circumstance dimensions specified in the partial event, two dimension matches comprising events with identical values for each possible combination of two circumstance dimensions specified in the partial event, and one dimension matches comprising events with identical values for any one of the four circumstance dimensions specified in the partial event.

In various embodiments, all the candidate circumstance values identified at block 730 may be aggregated into a single consolidated set for further consideration and evaluation. In particular, at block 740, a plausibility weighting may be assigned to each of the candidate circumstance values using the event veracity score processing 600 as shown in FIG. 6 and described in further detail above. In various embodiments, at block 750, one or more potential candidates with the highest plausibility weighting may then be recommended to define the value for the fifth dimension as isolated at block 720.

According to various aspects, an exemplary system 800 in which the various aspects and embodiments described herein may be suitably practiced will now be described with reference to FIG. 8. For example, the system 800 shown in FIG. 8 may be a processor-based system that includes a central processing unit (CPU) 810 that includes a cache 816 and a processor 812. According to various embodiments, the CPU 810 may be coupled to a system bus 820, which may intercouple various other devices included in the processor-based system 800. As will be apparent to those skilled in the art, the CPU 810 may exchange address, control, and data information over the system bus 820 to communicate with the other devices included in the processor-based system 800, which can include suitable devices. For example, as illustrated in FIG. 8, the devices included in the processor-based system 800 can include a memory subsystem 830 that can include static memory 832 and/or dynamic memory 834, one or more input devices 822, one or more output devices 824, a network interface device 826, and a display controller 840. In various embodiments, the input devices 822 can include any suitable input device type, including but not limited to input keys, switches, voice processors, etc. The output devices 824 can similarly include any suitable output device type, including but not limited to audio, video, other visual indicators, etc. The network interface device 826 can be any device configured to allow exchange of data to and from a network 880, which may comprise any suitable network type, including but not limited to a wired or wireless network, private or public network, a local area network (LAN), a wide local area network (WLAN), and the Internet. The network interface device 826 can support any type of communication protocol desired. The CPU 810 can access the memory subsystem 830 over the system bus 820.

According to various embodiments, the CPU 810 can also access the display controller 840 over the system bus 820 to control information sent to a display 870. The display controller 840 can include a memory controller 842 and memory 844 to store data to be sent to the display 870 in response to communications with the CPU 810. The display controller 840 sends information to the display 870 to be displayed via a video processor 860, which processes the information to be displayed into a format suitable for the display 870. The display 870 can include any suitable display type, including but not limited to a cathode ray tube (CRT), a liquid crystal display (LCD), a plasma display, an LED display, a touchscreen display, a virtual-reality headset, and/or any other suitable display.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, quantum spin states, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for identifying and documenting events based on logical semantic circumstance dimensions, comprising:
   receiving, at a context engine having one or more processors, data that defines at least a first event and multiple additional events;
   storing, in a database coupled to the context engine, the received data that defines at least the first event and the multiple additional events according to a circumstance-event relationship model, wherein the circumstance-event relationship model defines relationships among individual event circumstances associated with the first event and among different combinations of the individual event circumstances in multiple dimensions, wherein the circumstance-event relationship model uniquely identifies at least one of the first event or the multiple additional events according to a concatenated aggregation of unique values for actor, location, time, action, and motivation circumstances;
   determining, at the context engine, a relationship between the first event and one or more of the multiple additional events based on an evaluation of a selected one of the individual event circumstances and one or more other event circumstances associated with the first event, and different combinations of the one or more other event circumstances associated with the first event in the multiple dimensions; and
   providing, by the context engine, one or more analytic tools to analyze the relationship between the first event and the one or more of the multiple additional events.

2. The method recited in claim 1, wherein the individual event circumstances include at least an actor associated with an event, a time when the event occurred, a place where the event occurred, an action representing what occurred in the event, and a motivation indicating why the event occurred.

3. The method recited in claim 1, further comprising:
   displaying, on a user interface coupled to the context engine, an event construct representing circumstances of the one or more of the multiple additional events that are associated with the first event in the multiple dimensions.

4. The method recited in claim 3, wherein the displayed event construct comprises a tetrahedron having four points that respectively represent four different circumstances associated with a particular event and a sphere merged with the tetrahedron to represent a fifth circumstance associated with the particular event.

5. The method recited in claim 1, further comprising:
   determining, at the context engine, a relationship between a first value for a selected one of the individual event circumstances and a second value for the selected one of the individual event circumstances, wherein the relationship between the first value and the second value for the selected one of the individual event circumstances is one of an equivalent, nested, or proximity relationship.

6. The method recited in claim 1, wherein the relationship between the first event and the one or more of the multiple additional events is determined based on a dimensional weighting applied to multiple scores that represent an affinity between the individual event circumstances associated with the first event and the one or more of the multiple additional events in the multiple dimensions other than one of the multiple dimensions selected for investigation.

7. The method recited in claim 1, further comprising:
   assigning a veracity score to the first event, wherein the assigned veracity score indicates a degree to which the first event is considered truthful.

8. The method recited in claim 7, wherein the veracity score assigned to the first event has a zero value in response to the one or more of the multiple additional events containing an actor circumstance and a time circumstance that match the first event and a high confidence place circumstance that differs from the first event.

9. The method recited in claim 7, wherein the veracity score assigned to the first event has a non-zero value based on a consistency among circumstances associated with different events involving an actor associated with the first event in response to determining that no other known events contain an actor circumstance and a time circumstance that match the first event and a high confidence place circumstance that differs from the first event.

10. The method recited in claim 1, further comprising:
    identifying one or more potential values for one of the individual event circumstances associated with the first event in response to the received data partially defining circumstances associated with the first event, wherein the one or more potential values are determined based on a veracity score indicating a degree to which one or more events that match the partially defined circumstances are considered truthful.

11. The method recited in claim 1, wherein the data that defines the first event is received via one or more crowd sourcing and batch collection methods.

12. The method recited in claim 1, wherein the data that defines the first event is received via a circumstance and event entry user interface.

13. A system for identifying and documenting events based on logical semantic circumstance dimensions, comprising:
    an input device configured to receive data that defines at least a first event and multiple additional events;
    a database configured to store the received data that defines at least the first event and the multiple additional events according to a circumstance-event relationship model that defines relationships among individual event circumstances and among different combinations of the individual event circumstances in multiple dimensions, wherein the circumstance-event relationship model uniquely identifies at least one of the first event or the multiple additional events according to a concatenated aggregation of unique values for actor, location, time, action, and motivation circumstances; and at least one processor configured to determine a relationship between the first event and one or more of the multiple additional events based on an evaluation of other event circumstances associated with the first event, and different combinations of the other event circumstances associated with the first event in the multiple dimensions and to provide one or more analytic tools to analyze the relationship between the first event and the one or more of the multiple additional events.

14. The system recited in claim 13, wherein the individual event circumstances include at least an actor associated with an event, a time when the event occurred, a place where the event occurred, an action representing what occurred in the event, and a motivation indicating why the event occurred.

15. The system recited in claim 13, further comprising a display device configured to display an event construct representing circumstances of the one or more of the multiple additional events that are associated with the first event in the multiple dimensions.

16. The system recited in claim 15, wherein the displayed construct comprises a tetrahedron having four points that respectively represent four different circumstances associated with a particular event and a sphere merged with the tetrahedron to represent a fifth circumstance associated with the particular event.

17. The system recited in claim 13, wherein the at least one processor is further configured to determine a relationship between a first value for a selected one of the individual event circumstances and a second value for the selected one of the individual event circumstances, wherein the relationship between the first value and the second value for the selected one of the individual event circumstances is one of an equivalent, nested, or proximity relationship.

18. The system recited in claim 13, wherein the relationship between the first event and the one or more of the multiple additional events is determined based on a dimensional weighting applied to multiple scores that represent an affinity between the individual event circumstances associated with the first event and the one or more of the multiple additional events in the multiple dimensions other than one of the multiple dimensions selected for investigation.

19. The system recited in claim 13, wherein the at least one processor is further configured to assign a veracity score to the first event, the assigned veracity score indicating a degree to which the first event is considered truthful.

20. The system recited in claim 19, wherein the veracity score assigned to the first event has a zero value in response to the one or more of the multiple additional events containing an actor circumstance and a time circumstance that match the first event and a high confidence place circumstance that differs from the first event.

21. The system recited in claim 19, wherein the veracity score assigned to the first event has a non-zero value based on a consistency among circumstances associated with different events involving an actor associated with the first event in response to a determination that no other known events contain an actor circumstance and a time circumstance that match the first event and a high confidence place circumstance that differs from the first event.

22. The system recited in claim 13, wherein the at least one processor is further configured to identify one or more potential values for one of the individual event circumstances associated with the first event in response to the received data partially defining circumstances associated with the first event, the one or more potential values determined based on a veracity score indicating a degree to which one or more events that match the partially defined circumstances are considered truthful.

23. The system recited in claim 13, wherein the input device is configured to receive the data that defines the first event via one or more crowd sourcing and batch collection methods.

24. The system recited in claim 13, wherein the input device is configured to receive the data that defines the first event via a circumstance and event entry user interface.

25. A non-transitory computer-readable storage medium having computer-executable instructions recorded thereon, the computer-executable instructions configured to cause a computer having at least one processor to:
    receive data that defines at least a first event and multiple additional events;
    store the received data that defines at least the first event and the multiple additional events in a database according to a circumstance-event relationship model, wherein the circumstance-event relationship model defines relationships among individual event circumstances and among different combinations of the individual event circumstances in multiple dimensions, wherein the circumstance-event relationship model uniquely identifies at least one of the first event or the multiple additional events according to a concatenated aggregation of unique values for actor, location, time, action, and motivation circumstances;
    determine a relationship between the first event and one or more of the multiple additional events based on an evaluation of other event circumstances associated with the first event, and different combinations of the other event circumstances associated with the first event in the multiple dimensions; and
    provide one or more analytic tools to analyze the relationship between the first event and the one or more of the multiple additional events.

\* \* \* \* \*